US012775153B2

(12) United States Patent
Wu et al.

(10) Patent No.: US 12,775,153 B2
(45) Date of Patent: Oct. 27, 2026

(54) OPTICAL LENS AND ELECTRONIC DEVICE

(71) Applicant: HONOR DEVICE CO., LTD., Shenzhen (CN)

(72) Inventors: Bin Wu, Shenzhen (CN); Xianxian Zhang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 438 days.

(21) Appl. No.: 18/266,910

(22) PCT Filed: Dec. 27, 2022

(86) PCT No.: PCT/CN2022/142498
§ 371 (c)(1),
(2) Date: Jun. 13, 2023

(87) PCT Pub. No.: WO2023/142841
PCT Pub. Date: Aug. 3, 2023

(65) Prior Publication Data

US 2024/0210654 A1 Jun. 27, 2024

(30) Foreign Application Priority Data

Jan. 25, 2022 (CN) ........................ 202210083260.4

(51) Int. Cl.
*G02B 13/00* (2006.01)
*G02B 9/04* (2006.01)

(52) U.S. Cl.
CPC ............ *G02B 13/003* (2013.01); *G02B 9/04* (2013.01)

(58) Field of Classification Search
CPC ................ G02B 13/003; G02B 13/004; G02B 13/0075; G02B 13/0045; G02B 13/0015;
(Continued)

(56) References Cited

U.S. PATENT DOCUMENTS

| | | | |
|---|---|---|---|
| 8,179,618 | B2 | 5/2012 | Baba et al. |
| 11,366,294 | B2 | 6/2022 | Hsu et al. |

(Continued)

FOREIGN PATENT DOCUMENTS

| | | | |
|---|---|---|---|
| CN | 102109659 | A | 6/2011 |
| CN | 209167649 | U | 7/2019 |

(Continued)

*Primary Examiner* — William R Alexander
*Assistant Examiner* — Kuei-Jen L Edenfield
(74) *Attorney, Agent, or Firm* — WOMBLE BOND DICKINSON (US) LLP

(57) ABSTRACT

An optical lens includes: a first lens group, a focal power adjustable element, and a second lens group in sequence from an object side to an image side in an optical axis direction. The focal power adjustable element is configured to change a focal length of the optical lens. The first lens group includes at least two lenses. The second lens group includes at least one lens. The optical lens is specifically an auto focus lens. A focal power of the focal power adjustable element is adjusted, so that the focal length of the optical lens can be changed. This enables the optical lens to form an image of an object at different object distances and implement auto focus. In solutions provided in this application, the focal power adjustable element with a large size is placed between the first lens group and the second lens group.

17 Claims, 15 Drawing Sheets

(58) Field of Classification Search
CPC ........ G02B 7/09; G02B 13/009; G02B 13/00; G02B 9/04–10; G02B 13/18; G02B 3/04; G03B 13/36; G03B 30/00
USPC .................................................. 359/646, 717
See application file for complete search history.

(56) References Cited

U.S. PATENT DOCUMENTS

| | | | | |
|---|---|---|---|---|
| 2021/0048629 | A1* | 2/2021 | Kuo | G02B 26/004 |
| 2022/0382020 | A1 | 12/2022 | Kwon | |
| 2023/0057429 | A1* | 2/2023 | Kwon | G02B 13/0045 |

FOREIGN PATENT DOCUMENTS

| | | | |
|---|---|---|---|
| CN | 112241059 | A | 1/2021 |
| CN | 113287049 | A | 8/2021 |
| CN | 113296242 | A | 8/2021 |
| CN | 113885167 | A | 1/2022 |
| CN | 114114646 | A | 3/2022 |
| KR | 20180099148 | A | 9/2018 |
| KR | 20200085674 | A | 7/2020 |
| KR | 20210099915 | A | 8/2021 |
| WO | 2021071320 | A1 | 4/2021 |
| WO | 2021157959 | A1 | 8/2021 |

* cited by examiner

OPTICAL LENS AND ELECTRONIC DEVICE

CROSS-REFERENCE TO RELATED APPLICATIONS

This application is a national stage of International Application No. PCT/CN2022/142498 filed on Dec. 27, 2022, which claims priority to Chinese Patent Application No. 202210083260.4 filed on Jan. 25, 2022. The disclosures of both of the aforementioned application are hereby incorporated by reference in their entireties.

TECHNICAL FIELD

This application relates to the field of terminal technologies, and in particular to an optical lens and an electronic device.

BACKGROUND

At present, an electronic device usually has an optical lens to implement a shooting function. In addition, to form a clear image of an object at different distances, the optical lens has a function of auto focus. To implement auto focus, the optical lens includes a focal power adjustable element. During shooting, a focal power of the focal power adjustable element is adjusted, to enable a focal length of the optical lens to be changed entirely, implementing auto focus. At present, in the optical lens, the focal power adjustable element is placed at a front-most end of the whole optical lens. A front end is an end close to an object side.

At present, the optical lens is usually embedded in the electronic device. To enable external light to enter the optical lens, a hole is to be provided on a surface of the electronic device. Because the focal power adjustable element is usually a combination of optical lenses with different shapes and has a large size, a large hole is to be provided on the surface of the electronic device when the focal power adjustable element is placed at the front-most end of the whole optical lens. When the optical lens is a front facing optical lens of the electronic device, the large hole reduces a screen-to-body ratio of the electronic device.

SUMMARY

To resolve the foregoing problem, this application provides an optical lens and an electronic device, so that a size of a hole to be provided for the optical lens is reduced, to increase a screen-to-body ratio of the electronic device.

According to a first aspect, this application provides an optical lens. The optical lens includes: a first lens group, a focal power adjustable element, and a second lens group in sequence from an object side to an image side in an optical axis direction. The first lens group includes at least two lenses. The second lens group includes at least one lens.

The optical lens is specifically an auto focus lens. By adjusting a focal power of the focal power adjustable element, a focal length of the optical lens can be changed.

In solutions provided in this application, the focal power adjustable element with a large lateral size is placed between the first lens group and the second lens group. This enables a size of a front end of the optical lens to be small, reducing a size of a hole to be provided on a surface of the electronic device and increasing a utilization rate of the surface of the electronic device.

In a possible implementation, the first lens group includes at least a first lens and a second lens in sequence from the object side to the image side.

$(\Sigma CT12)/TTL \geq 0.08$, where $\Sigma CT12$ is an on-axis distance from an object side surface of the first lens to an image side surface of the second lens, and TTL is an on-axis distance from the object side surface of the first lens to an image plane of the optical lens.

$\Sigma CT12/TTL$ is used for representing a ratio of the first lens and the second lens to an entire size of the optical lens in the optical axis direction.

Because a lateral size of the first lens and a lateral size of the second lens are less than a lateral size of the focal power adjustable element respectively, when $\Sigma CT12/TTL$ is large, a lens head (close to the object side) has a small lateral size. This enables a size of the hole to be small, increasing a screen-to-body ratio of a terminal. The lens head has a large axial size, increasing smoothness of light entering an optical system.

In a possible implementation, the first lens group includes at least a first lens and a second lens in sequence from the object side to the image side.

$TTL/f \leq 1.83$, where TTL is an on-axis distance from an object side surface of the first lens to an image plane of the optical lens, and f is the focal length of the optical lens.

The optical lens has a small TTL/f. This enables the optical lens to have a small axial size and implement clear imaging of an object at a long shooting distance.

In a possible implementation, the first lens group includes at least a first lens and a second lens in sequence from the object side to the image side.

An object side surface of the first lens is convex at a paraxial position, and an image side surface of the first lens is concave at the paraxial position.

$f1/f \leq 2.33$, where f1 is a focal length of the first lens, and f is the focal length of the optical lens.

The optical lens has a small f1/f. This enables a size of the optical lens in the axial direction to be small, implementing miniaturization of the size of the optical lens, and reducing sensitivity of the optical lens to an error caused by lens processing.

In a possible implementation, the first lens group includes at least a first lens and a second lens in sequence from the object side to the image side.

$-53.57 \leq f2/f \leq 77.70$, where f2 is a focal length of the second lens, and f is the focal length of the optical lens.

In a possible implementation, $-98.57 \leq (R5+R6)/(R5-R6) \leq 6.84$, where R5 is a central curvature radius of a third lens of the optical lens from the object side to the image side, and R6 is a central curvature radius of the third lens of the optical lens from the object side to the image side.

When the third lens has a small central curvature radius, the third lens can buffer an incident angle of light to a subsequent lens, smooth a trend of light, and reduce sensitivity of the optical lens to an error caused by lens processing.

In a possible implementation, $Yl/IH \leq 1.75$, where Yl is an effective clear aperture of an image side surface of a last lens of the optical lens from the object side to the image side, and IH is a half image height of the optical lens.

IH is a half-image height of the optical lens in a full field of view. The optical lens has a small Yl/IH, which can reduce a size of a rear end (close to the image side) of the optical lens and helps to minimize a structure of the optical lens. While an axial distance between the optical lens and a photosensitive element is increased, a size of a target surface for forming an image is increased, improving a resolution capability of the optical lens for details of an object.

In a possible implementation, the first lens group includes at least a first lens and a second lens in sequence from the object side to the image side.

IH/TTL≤0.88, where IH is a half image height of the optical lens, and TTL is an on-axis distance from an object side surface of the first lens to an image plane of the optical lens.

The optical lens has a small IH/TTL, which can reduce the size of the optical lens and obtain an imaging result with a high pixel, namely, improve imaging definition.

In a possible implementation, the first lens group includes at least a first lens and a second lens in sequence from the object side to the image side.

MaxY12/IH≤0.89, where MaxY12 is a largest clear aperture of clear apertures of the first lens and the second lens, and IH is a half image height of the optical lens.

The clear aperture of the first lens includes a clear aperture of the object side surface of the first lens and a clear aperture of the image side surface of the first lens. The clear aperture of the second lens includes a clear aperture of the object side surface of the second lens and a clear aperture of the image side surface of the second lens. MaxY12 is a largest clear aperture among the foregoing four clear apertures. The optical lens has a small MaxY12/IH, so that the optical lens has a small head size and a large image surface.

In a possible implementation, Fno≤2.9, where Fno is an aperture value of the optical lens.

The optical lens has a small Fno. This enables the optical lens to have a good imaging effect in a dark shooting environment.

In a possible implementation, Fov≥74.35°, where Fov is a full field of view of the optical lens.

The full field of view means a maximum full field of view that an optical lens can achieve.

The optical lens has a large full field of view Fov. This enables an image obtained by shooting includes abundant information.

According to a second aspect, this application provides an electronic device. The electronic device includes at least the optical lens according to any one of the foregoing.

The optical lens is specifically an auto focus lens. By adjusting a focal power of the focal power adjustable element, a focal length of the optical lens can be changed. In solutions provided in this application, the focal power adjustable element with a large lateral size is placed between the first lens group and the second lens group. This enables a size of a front end of the optical lens to be small, reducing a size of a hole to be provided on a surface of the electronic device and increasing a utilization rate of the surface of the electronic device.

DESCRIPTION OF EMBODIMENTS

Figure 1A:
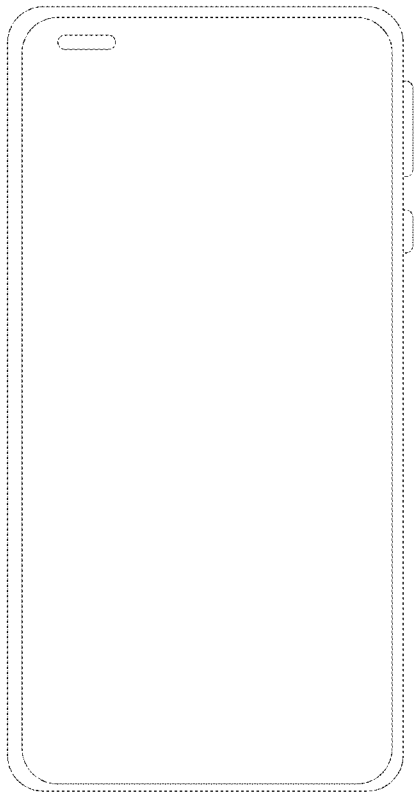
FIG. 1A is a schematic diagram of a structure of a mobile phone with a front facing camera lens.

To facilitate those skilled in the art to understand technical solutions provided in this application more clearly, terms in embodiments of this application are first described below.

Auto focus (Auto focus): A principle of object light reflection is used, reflected light is received by an imaging device on a camera, and a focusing apparatus is driven, based on an actual shooting process, to perform focusing. Based on a basic principle of focusing, auto focus may be usually divided into two types: auto focus based on ranging and auto focus based on focus detection. The auto focus based on ranging is based on detection of a distance between a lens and an object to be shot. The auto focus based on focus detection is based on focus detection with clear imaging on a focal plane.

Focal power (Focal power): This is used for representing a deflection capability of an optical system for light, and is equal to a difference between a beam convergence in image space and a beam convergence in object space. When a refractive index of air is approximate to 1, the focal power may be expressed as a reciprocal of a focal length of the image space. As a value of the focal power is larger, refraction of an optical system for an incident parallel beam is stronger. When the focal power is greater than 0), the refraction of the optical system is converging. When the focal power is less than 0, the refraction of the optical system is divergent. When the focal power is equal to 0, the focal power is corresponding to plane refraction. That is, a parallel optical axis in an optical axis is still a parallel beam in the optical axis after refraction, without light refraction.

Focal power adjustable element: The focal power adjustable element usually includes a plurality of lenses of different shapes, and focal power of the elements can be adjusted. During auto focus of an optical lens, a focal length of the optical lens can be adjusted by adjusting the focal power of the focal power adjustable element.

Aberration: Because imaging of most optical systems is imperfect, namely, is not ideal imaging, aberration is used for representing imperfection of optical system imaging. Aberrations of the optical system may be divided into a monochromatic aberration and a polychromatic aberration. The monochromatic aberrations mainly include a spherical aberration, coma, astigmatism, field curvature (image surface curvature), and distortion. The polychromatic aberration includes a vertical chromatic aberration and an axial chromatic aberration.

To facilitate understanding of technical solutions provided in embodiments of this application, common application scenarios of the embodiments of this application are described below.

At present, a front shooting function of an electronic device is becoming increasingly common. For the electronic device, a front surface usually belongs to a main functional region. For example, for an electronic device with a screen, the screen is located on a front surface of the electronic device and is used for implementing display and other human-computer interaction functions.

To improve use experience and diversify screen functions of the electronic device, a screen-to-body ratio of the electronic device is gradually increased. The screen-to-body ratio generally means a ratio of a screen area to a front surface area of the electronic device.

First, an application scenario of a scenario of this application is described by taking a mobile phone with a front facing camera lens as an example.

FIG. 1A is a schematic diagram of a structure of a mobile phone with a front facing camera lens.

As shown in FIG. 1A, the mobile phone includes a screen and the front facing camera lens.

The mobile phone has a large screen-to-body ratio. That is, a ratio of an area of the screen to an area of a front surface of the mobile phone is large.

The mobile phone further includes the front facing camera lens. To enable external light to enter an optical lens in the front facing camera lens, a hole is provided on a surface, corresponding to a position of the front facing camera lens, of the mobile phone.

The hole reduces an area of the screen and reduces the screen-to-body ratio of the mobile phone. Usually, the front facing camera lens of the mobile phone has an auto focus function. A specific principle is as follows: a focal power adjustable element is disposed at a front-most end of the optical lens, and a front end is an end close to an object to be shot. When a focal length of the optical lens is to be changed, for example, when a shooting environment changes or a shooting temperature changes, the focal length of the optical lens is changed entirely by controlling and adjusting a focal power of the focal power adjustable element, to implement auto focus.

Because the focal power adjustable element is usually a combination of optical lenses of different shapes and has a large size, in the foregoing manner, a large hole is to be provided on a front surface of the mobile phone, resulting in a reduction in the screen-to-body ratio of the mobile phone.

Figure 1B:
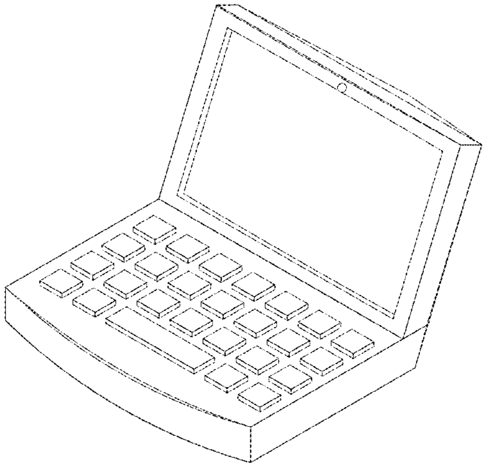
FIG. 1B is a schematic diagram of a structure of a portable computer with a front facing camera lens.

FIG. 1B is a schematic diagram of a structure of a portable computer with a front facing camera lens.

As shown in FIG. 1A, the portable computer includes a screen and a front facing camera lens.

To implement a front facing shooting function, the front facing camera lens is located in an upper region of the screen, and a hole is to be provided in a region in which the front facing camera lens is located on a surface of the portable computer.

To avoid the front facing camera lens, the screen is located below the region in which the front facing camera lens is located. Therefore, a size of the hole affects an area of the screen. When the size of the hole is large, a screen-to-body ratio of the portable computer is small.

To resolve the foregoing technical problem, an embodiment of this application provides an optical lens and an electronic device, to increase a utilization rate of a surface of the electronic device.

The optical lens includes: a first lens group, a focal power adjustable element, and a second lens group in sequence from an object side to an image side in an optical axis direction. The focal power adjustable element is configured to change a focal length of the optical lens. The first lens group includes at least two lenses, and the second lens group includes at least one lens.

By changing the focal length of the optical lens, the focal power adjustable element enables the optical lens to form an image of an object at different object distances and implement auto focus.

To reduce a size of the hole on the electronic device, a lateral size of a front end of the lens is to be reduced. An end, close to the object side, of the optical lens is referred to as the front end of the lens.

In the optical lens, a lens in the first lens group is a lens close to the object side and has a small size. Compared with a position of the lens in the first lens group, the focal power adjustable element G having a large size is located at a position close to the image side of the optical lens. This enables the front end of the optical lens to have a small lateral size. The lateral size of the front end of the optical lens affects a size of the hole provided on the surface of the electronic device. Therefore, in the solution of this embodiment, the lateral size of the front end of the optical lens can be reduced, and the size of the hole provided on the surface of the electronic device can be reduced, increasing a screen-to-body ratio of the electronic device.

In the description of this application, terms such as “first” and “second” are used merely for descriptive purposes, and cannot be understood as indicating or implying relative importance or implicitly indicating a quantity of indicated technical features.

In this application, unless otherwise clearly specified and limited, a term “connection” should be understood in a broad sense. For example, a “connection” may be a fixed connection, a detachable connection, or an integrated structure, may be a direct connection, or may be an indirect connection through an intermediary.

In embodiments of this application, a type of a terminal device is not specifically limited. The terminal device may be a mobile phone, a notebook computer, a wearable electronic device (such as a smart watch), a tablet computer, an augmented reality (augmented reality, AR) device, a virtual reality (virtual reality, VR) device, or the like.

Figure 1C:
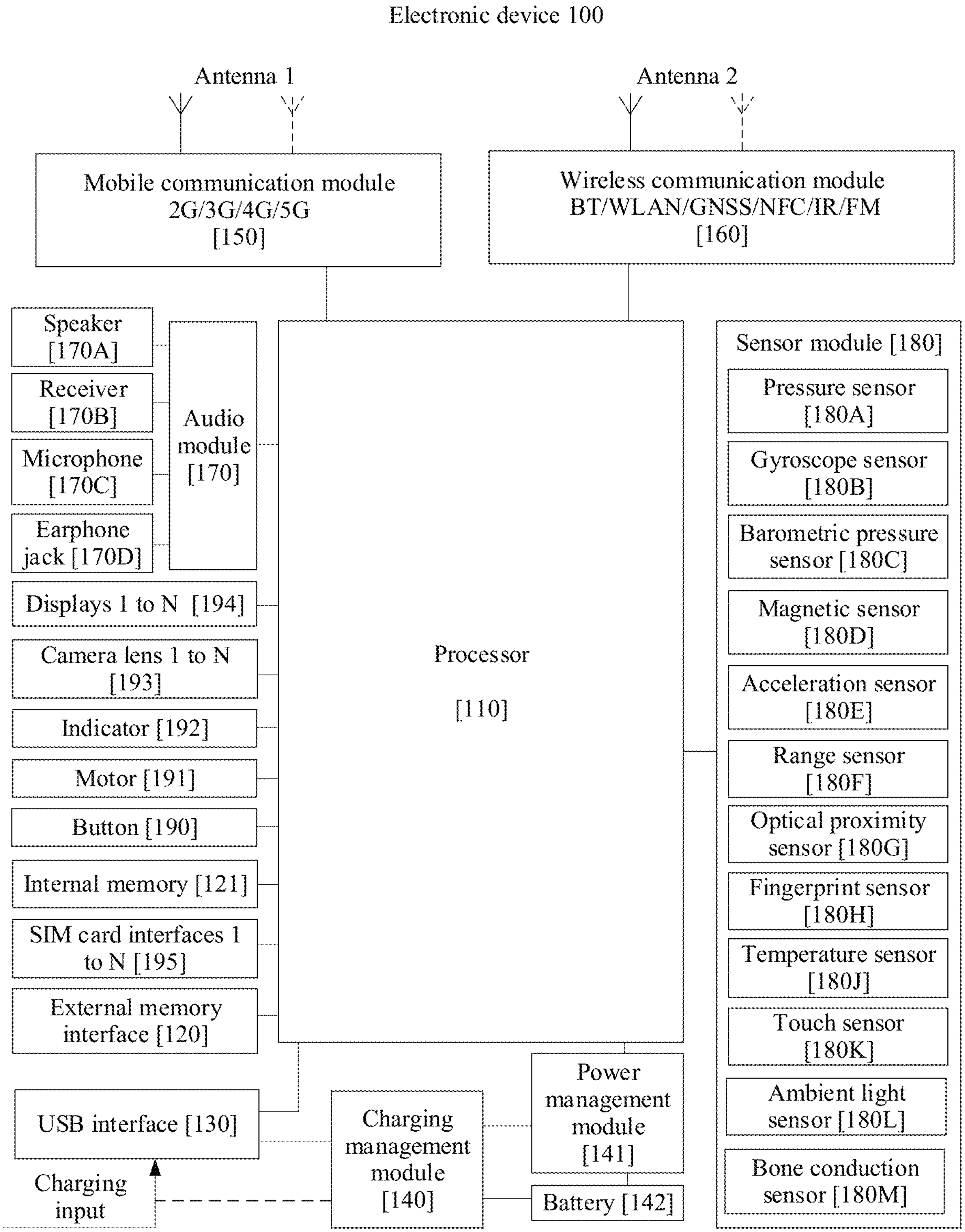
FIG. 1C is a schematic diagram of an architecture of an electronic device according to an embodiment of this application.

An architecture of the terminal device is described below;

FIG. 1C is a schematic diagram of an architecture of an electronic device according to an embodiment of this application.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera lens 193, a display 194, a subscriber identity module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient optical sensor 180L, a bone conduction sensor 180M, and the like.

It may be understood that a structure shown in this embodiment of the present invention does not constitute a specific limitation on the electronic device 100. In some other embodiments of this application, the electronic device 100 may include more or fewer components than those shown in the figure, or combine some components, or split some components, or have a different component arrangement. The components shown in the figure may be implemented in hardware, software, or a combination of software and hardware.

The electronic device 100 implements a display function by using the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs and execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flex light-emitting diode (flex light-emitting diode, FLED), a mini-LED, a micro-LED, a micro-OLED, a quantum dot light emitting diode (quantum dot light emitting diode, QLED), or the like. In some embodiments, the electronic device 100 may include one or N displays 194. N is a positive integer greater than 1.

The electronic device 100 may implement a shooting function through the camera lens 193, the ISP, the video codec, the GPU, the display 194, the application processor, and the like.

The ISP is configured to process data fed back by the camera lens 193. For example, during shooting, a shutter is pressed, and light is transmitted to a photosensitive element of the camera lens through a lens. An optical signal is converted into an electrical signal, and the photosensitive element of the camera lens transmits the electrical signal to the ISP for processing, to convert the electrical signal into a visible image. The ISP may further perform algorithm optimization on noise, brightness, and complexion of the image. The ISP may further optimize parameters such as exposure and a color temperature of a shooting scene. In some embodiments, the ISP may be disposed in the camera lens 193.

The camera lens 193 is configured to capture a still image or a video. An optical image of an object is generated through a lens, and is projected onto a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N camera lenses 193. N is a positive integer greater than 1.

The optical lens in this embodiment of this application may be an integral part of the camera lens 193 of the electronic device 100. The optical lens generates an optical image of an object to be shot and projects the optical image to a photosensitive element, completing imaging of the object to be shot.

An embodiment of this application provides an optical lens.

Figure 2:
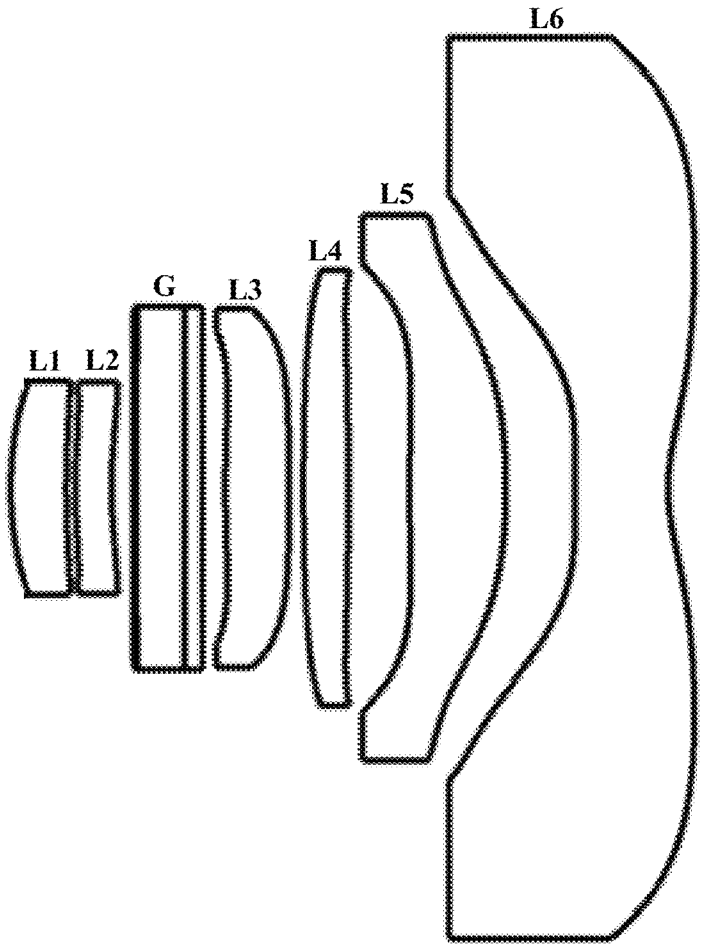
FIG. 2 is a schematic diagram of a structure of an optical lens according to an embodiment of this application.

FIG. 2 is a schematic diagram of a structure of an optical lens according to an embodiment of this application.

As shown in FIG. 2, a lens module 200 includes: a first lens group 201, a focal power adjustable element G, and a second lens group 202 from an object side to an image side in sequence in an optical axis direction.

The first lens group 201 includes at least two lenses. In FIG. 2, for example, the first lens group 201 includes a first lens L1 and a second lens L2. The first lens group 201 may alternatively include more than two lenses.

The second lens group 202 includes at least one lens. In FIG. 2, for example, the second lens group 202 includes a third lens L3, a fourth lens L4, a fifth lens L5, and a sixth lens L6 in sequence from the object side to the image side. The second lens group 202 may alternatively include lenses of another quantity. For example, the second lens group 202 may include one lens, two lenses, or more than three lenses.

The focal power adjustable element G is configured to change a focal length of the optical lens 200.

By changing the focal length of the optical lens 200, the focal power adjustable element G enables the optical lens 200 to form an image of an object at different object distances and implement auto focus.

The focal power adjustable element G is located between the second lens L2 and the third lens L3. In other words, the focal power adjustable element G is located between the first lens group 201 and the second lens group 202.

To reduce a size of the hole on the electronic device, a lateral size of a front end of the lens is to be reduced. An end, close to the object side, of the optical lens is referred to as the front end of the lens.

In the optical lens 200, the first lens L1 and the second lens L2 are lenses close to the object side and have small sizes. Compared with positions of the first lens L1 and the second lens L2, the focal power adjustable element G having a large size is located at a position close to the image side of the optical lens 200. This enables the front end of the optical lens 200 to have a small lateral size. The lateral size of the front end of the optical lens 300 affects a size of the hole provided on the surface of the electronic device. Therefore, in the solution of this embodiment, the lateral size of the front end of the optical lens 300 can be reduced, and the size of the hole provided on the surface of the electronic device can be reduced, increasing a screen-to-body ratio of the electronic device.

Description is made as follows with reference to a specific implementation.

An embodiment of this application further provides another optical lens.

Figure 3A:
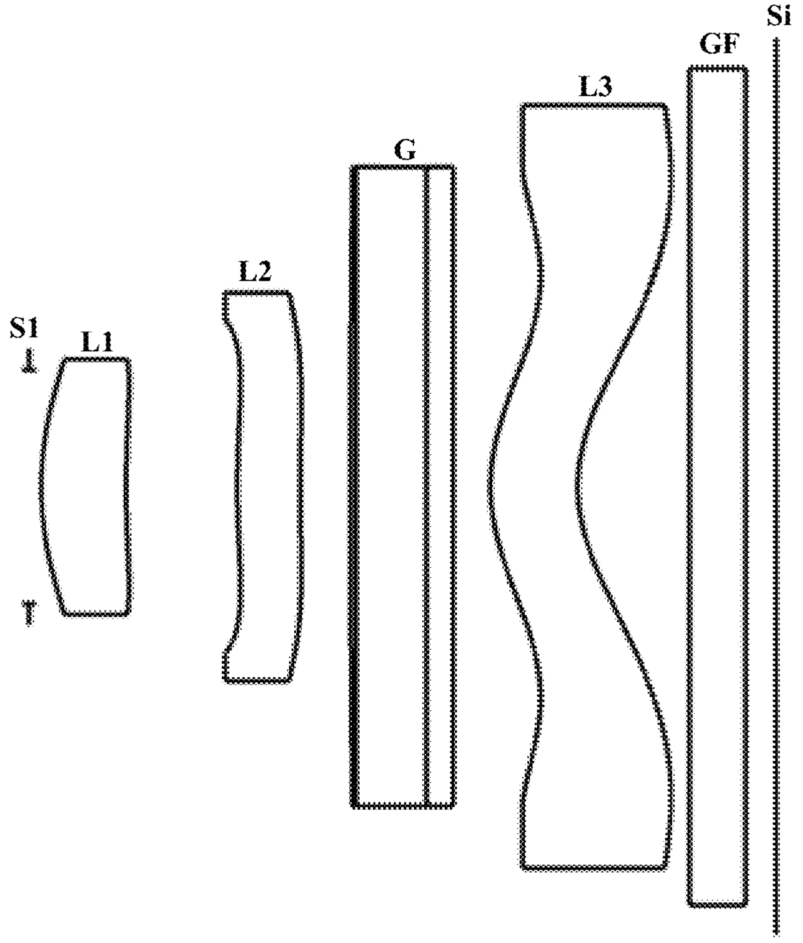
FIG. 3A is a schematic diagram of a structure of an optical lens according to another embodiment of this application.

FIG. 3A is a schematic diagram of a structure of an optical lens according to another embodiment of this application.

As shown in FIG. 3A, a lens module 200 includes: a first lens group 201, a focal power adjustable element G, and a second lens group 202 from an object side to an image side in sequence in an optical axis direction.

The first lens group 201 includes a first lens L1 and a second lens L2 in sequence from an object side to an image side in an optical axis direction. The second lens group 202 includes a third lens L3.

The focal power adjustable element G is located between the second lens L2 and the third lens L3.

For ease of description, in the following description of the lens module 200 in this embodiment, in the optical axis direction, an end close to the object side is referred to as a front end, and an end close to the image side is referred to as a rear end. For example, for the first lens group 201 in this embodiment, the first lens L1 precedes the second lens L2.

An end, close to the object side, of the optical lens is referred to as a front end of the lens (a lens head), and an end, close to the image side, of the optical lens is referred to as a rear end of the lens.

Because the lens head is an end close to an electronic surface, a size of the lens head affects a size of a hole provided on the electronic device.

Specifically, a direction perpendicular to an optical axis is a lateral direction, and a lateral size of the lens head affects the size of the hole provided on the electronic device. When the lateral size of the lens head is large, the size of the hole provided on the electronic device needs to be large. When the lateral size of the lens head is small, the size of the hole provided on the electronic device needs to be small.

Therefore, by reducing the lateral size of the lens head, the size of the hole provided on the electronic device can be reduced.

In a possible implementation, the optical lens 200 may further include an optical filter GF. The optical filter GF is located behind the second lens group 202.

The optical filter GF allows only light with a specific wavelength to pass through, and cuts off light with other wavelengths. This can, for example, suppress optical noise, strengthen an optical signal, and the like.

In one possible case, the lens may be made of plastic.

In this embodiment, the lens module 200 includes: a first lens L1, a second lens L2, a focal power adjustable element G, a third lens L3, and an optical filter GF in sequence from the object side to the image side in the optical axis direction.

S is an aperture; and Si is an image surface.

Refer to Table 1a for parameters of elements in the optical lens provided in this TABLE 1a Parameters of elements in the optical lens

| | R | d | nd | vd |
|---|---|---|---|---|
| S | $R_S$ = Infinity | d0 = 0.046 | | |
| L1 | $R_{object}1$ = 1.349 | d1 = 0.320 | nd1 = 1.5444 | v1 = 55.82 |
| | $R_{image}1$ = 7.192 | d2 = 0.004 | | |
| L2 | $R_{object}2$ = −17.490 | d3 = 0.234 | nd2 = 1.5444 | v2 = 55.82 |
| | $R_{image}2$ = −7.063 | d4 = 0.043 | | |
| G | \ | CT = 0.385 | | |
| L3 | $R_{object}3$ = 7.562 | d5 = 0.328 | nd3 = 1.5444 | v3 = 55.82 |
| | $R_{image}3$ = 0.369 | d6 = 0.420 | | |
| GF | $R_{object}g$ = Infinity | d7 = 0.210 | ndg = 1.5444 | Vg = 19.39 |

In Table 1a, meanings of symbols are as follows.

R: a central curvature radius of a lens or an optical filter. Infinity is infinity.

$R_S$ is a central curvature radius of an aperture.

$R_{object}$ is a central curvature radius of an object side surface of the lens or optical filter.

$R_{image}$ is a central curvature radius of an image side surface of the lens or optical filter.

$R_{object}$ 1 is a central curvature radius of an object side surface of the first lens L1.

$R_{image}$ 1 is a central curvature radius of an image side surface of the first lens L1.

$R_{object}$ 2 is a central curvature radius of an object side surface of the second lens L2.

$R_{image}$ 2 is a central curvature radius of an image side surface of the second lens L2.

$R_{object}$ 3 is a central curvature radius of an object side surface of the third lens L3.

$R_{image}$ 3 is a central curvature radius of an image side surface of the third lens L3.

$R_{object}$ g is a central curvature radius of an object side surface of the optical filter GF.

$R_{image}$ g is a central curvature radius of an image side surface of the optical filter GF.

d is an axial thickness of the lens or an on-axis distance between optical elements, where the on-axis distance means a distance on the optical axis.

d0 is an on-axis distance from the aperture S to the object side surface of the first lens L1.

d1 is an on-axis thickness of the first lens L1.

d2 is an on-axis distance from the image side surface of the first lens L1 to the object side surface of the second lens L2.

d3 is an on-axis thickness of the second lens L2.

d4 is an on-axis distance from the image side surface of the second lens L2 to the object side surface of the third lens L3.

CT is an on-axis thickness of the focal power adjustable optical element G.

d5 is an on-axis thickness of the third lens L3.

d6 is an on-axis distance from the image side surface of the third lens L3 to the object side surface of the optical filter GF.

d7 is an on-axis thickness of the optical filter GF.

d8 is an on-axis distance from the image side surface of the optical filter GF to the image surface Si.

nd is a refractive index of a d-line (d-line is green light with a wavelength of 550 nm).

nd1 is a refractive index of a d-line of the first lens L1.

nd2 is a refractive index of a d-line of the second lens L2.

nd3 is a refractive index of a d-line of the third lens L3.

ndg is a refractive index of a d-line (d-line is green light with a wavelength of 550 nm) of the optical filter GF.

vd is an Abbe number.

v1 is an Abbe number of the first lens L1.

v2 is an Abbe number of the second lens L2.

v3 is an Abbe number of the third lens L3.

vg is an Abbe number of the optical filter GF.

For an aspheric lens surface of each lens, the aspheric surface is obtained by Formula (1).

$$z=\frac{cr^2}{\left\{1+\left[1-(k+1)\left(c^2r^2\right)\right]^{\frac{1}{2}}\right\}+A_4r^4+A_{64}r^6+A_8r^8+A_{10}r^{10}+A_{12}r^{12}+A_{14}r^{14}+A_{16}r^{16}+A_{18}} \quad (1)$$

z is a depth of an aspheric surface, c is a curvature at a center of an optical surface, r is a vertical distance between a point on an aspheric surface curve and an optical axis, k is a conic coefficient, and A_4, A_6, A_8, A_10, A_12, A_14, A_16, A_18, and A_20 are aspheric coefficients.

For values of the conic coefficient k and aspheric coefficients of lenses in the optical lens 200 provided in this embodiment, refer to Table 1b.

TABLE 1c-continued

| Parameters of the optical lens | | | |
|---|---|---|---|
| Parameter | First structure | Second structure | Third structure |
| Fno | 2.40 | 2.40 | 2.40 |
| f1/f | 1.43 | 1.43 | 1.43 |
| f2/f | 7.05 | 7.05 | 7.05 |
| $(R_{object}3 + R_{image}3)/(R_{object}3 - \text{image}3)$ | 1.10 | 1.10 | 1.10 |
| YI/IH | 1.75 | 1.75 | 1.75 |
| IH/TTL | 0.55 | 0.55 | 0.55 |
| MaxY12/IH | 0.89 | 0.89 | 0.89 |
| Fov (°) | 74.36 | 74.35 | 74.35 |

In Table 1c, the first structure, the second structure, and the third structure are parameters of the optical lens 200 separately when shooting an object at three different distances.

In Table 1c, meanings of symbols are as follows.

OBJ is a distance on the optical axis from an object to be shot to the object side surface of the first lens L1 in the optical lens 200.

TABLE 1b

| Conic coefficients and aspheric coefficients of elements in the optical lens | | | | | |
|---|---|---|---|---|---|
| | Conic coefficient | Aspheric coefficient | | | |
| | k | A4 | A6 | A8 | A10 |
| $R_{object}1$ | −1.0132E+01 | 1.2296E−01 | −3.3267E−01 | 1.0228E+00 | −4.0027E+00 |
| $R_{image}1$ | −5.7062E+01 | −5.2261E−02 | −1.5231E−01 | 1.7008E−01 | 6.6724E−01 |
| $R_{object}2$ | 4.9359E+02 | −1.7197E+00 | 5.7611E+00 | −3.8565E+01 | 6.3400E+01 |
| $R_{image}2$ | 5.7579E+01 | −4.6511E+00 | 3.4141E+01 | −1.9429E+02 | 4.3738E+02 |
| $R_{object}3$ | −5.7401E+02 | −2.8149E+01 | 5.8805E+01 | −1.2993E+02 | 7.3512E+02 |
| $R_{image}3$ | −1.1850E+00 | −2.2371E+01 | 1.1924E+02 | −2.7897E+02 | 1.9013E+02 |
| | Aspheric coefficient | | | | |
| | A12 | A14 | A16 | A18 | A20 |
| $R_{object}1$ | 7.9290E+00 | −1.2466E+00 | −1.1481E+01 | −4.8777E+01 | 1.1878E+02 |
| $R_{image}1$ | −4.5339E+00 | 6.7223E+00 | −2.3855E+00 | 5.6999E+00 | −1.3899E+01 |
| $R_{object}2$ | −1.8243E+02 | 5.0953E+02 | 9.1275E+02 | −3.9558E+03 | −2.6041E+04 |
| $R_{image}2$ | −1.3917E+02 | 2.2571E+03 | −5.0360E+03 | −1.7738E+04 | 3.7855E+04 |
| $R_{object}3$ | −4.4781E+02 | −2.3104E+03 | −5.2449E+03 | 7.8076E+03 | 1.6318E+04 |
| $R_{image}3$ | −6.5300E+02 | 2.4009E+03 | 4.3993E+03 | 1.8901E+03 | −4.9661E+04 |

In Table 1b, both the conic coefficients and aspheric coefficients are expressed in scientific notation, for example, −1.0132E+01 represents −10.132. The same applies to other data, which is not described herein.

When parameters of elements in the optical lens 200 of this embodiment are described in Table 1a, refer to Table 1c for some parameters of the optical lens 200.

TABLE 1c

| Parameters of the optical lens | | | |
|---|---|---|---|
| Parameter | First structure | Second structure | Third structure |
| OBJ (mm) | 400 | 150 | 1,200 |
| fG (mm) | 208.27 | 9.44 | −1927.8 |
| IH | 1.641 | 1.641 | 1.641 |
| TTL | 3.01 | 3.01 | 3.01 |
| f | 2.12 | 1.83 | 2.13 |
| ΣCT12/TTL | 0.32 | 0.32 | 0.32 |
| TTL/f | 1.42 | 1.58 | 1.41 |

fG is a focal length of the focal power adjustable element G.

IH is a half-image height of imaging by the optical lens 200 in a full field of view.

TTL is a distance on the axis from the object side surface of the first lens L1 to an image plane of the optical lens 200.

F is a focal length of the optical lens 200.

ΣCT12 is an on-axis distance from the object side surface of the first lens L1 to the image side surface of the second lens L2.

Fno is a maximum aperture of the optical lens 200.

f1 is a focal length of the first lens L1.

f2 is a focal length of the second lens L1.

Yl is an effective clear aperture of an image side surface of a last lens of the optical lens 200, namely, an effective clear aperture of the image side surface of the third lens L3 in this embodiment.

MaxY12 is A maximum clear aperture of clear apertures of the first lens L1 and the second lens L2.

The clear aperture of the first lens includes a clear aperture of the object side surface of the first lens and a clear aperture of the image side surface of the first lens. The clear aperture of the second lens includes a clear aperture of the object side surface of the second lens and a clear aperture of the image side surface of the second lens. MaxY12 is a largest clear aperture among the foregoing four clear apertures.

Fov is a field of view in a diagonal direction of a full image surface, or a maximum full field of view.

Parameters of the optical lens 200 in this embodiment are analyzed as follows.

OBJ is used for representing a distance between the object to be shot and the optical lens 200, and may represent a shooting distance. Different OBJs in Table 3 is corresponding to parameters of the optical lens 200 that are used when shooting an object at different distances. In other words, different OBJs are corresponding to different shooting distances.

By adjusting the focal length (fG) of the focal power adjustable element G, the focal length (f) of the optical lens 200 is changed. This implements clear imaging of the object at different shooting distances. In other words, this implements a focusing function of the optical lens 200.

In this embodiment, the optical lens 200 can form a clear image of the object at different shooting distances by adjusting the focal length. As shown in Table 3, when OBJ is 400 mm, 150 mm, and 1,200 mm respectively; focal lengths of the optical lens 200 are 2.12 mm, 1.83 mm, and 2.13 mm respectively.

TTL is used for representing space occupied by the optical lens 200 in the optical axis direction. ΣCT12 is used for representing space occupied by the first lens L1 and the second lens L2 in the optical axis direction. ΣCT12/TTL is used for representing a ratio of the first lens L1 and the second lens L2 to an entire size of the optical lens 200 in the optical axis direction.

To implement a front shooting function of a terminal, a hole is to be provided on a surface on which a screen of the terminal is located.

Because a lateral size of the first lens L1 and a lateral size of the second lens L2 are less than a size of the focal power adjustable element G, and a ratio of the first lens L1 and the second lens L2 to the entire size of the optical lens 200 is large, the lens head has a small lateral size. This enables the size of the hole to be small, increasing a screen-to-body ratio of the terminal.

In addition, when ΣCT12/TTL is large, the lens head of the optical lens 200 has a large size in the optical axis direction, in other words, the optical lens 200 has a deep lens head, and light passes through the optical lens 200 smoothly, increasing smoothness of light entering an optical system.

The lens head has a small lateral size, which can reduce space occupied by the lens head of the optical lens 200.

The optical lens 200 has a small TTL/f. This enables the optical lens 200 to have a small axial size and implement clear imaging of an object at a long shooting distance.

A field of view (Field of View; Fov) of the optical system, also referred to as an angle of field of view; determines a scope of view of the optical system. The optical lens 200 has a large full field of view (Fov in Table 3), and an image obtained by shooting includes abundant information.

In this embodiment, an aperture value of the optical lens 200 is small, and intensity of light entering the optical lens 200 is large. This enables the optical lens 200 to have a good imaging effect in a dark shooting environment.

Based on the foregoing description, the optical lens 200 has both a small aperture value and a large field of view.

The first lens L1 has a positive refractive power, to converge incident light, which can compress a size of the lens head of the optical lens 200, and reduce the size of the hole provided on the screen of the terminal.

The object side surface of the first lens L1 is convex at a position close to the optical axis, and the image side surface of the first lens L1 is concave at a position close to the optical axis. This enables an angle between light on the object side surface and light on the image side surface of the first lens L1 to be small, so that light passes gently, helping to correct astigmatism and other aberrations.

f1/f of the optical lens 200 is small. This enables a size of the optical lens 200 in the axial direction to be small, implementing miniaturization of the size of the optical lens.

During manufacturing of elements of the optical system, there are usually dimensional errors caused by technologies. The dimensional errors affect imaging performance of the optical system. A tolerance means an error caused by processing, namely, a difference between an actual value and a design value.

When a ratio of the focal length of the first lens L1 to the focal length of the optical lens 200 is small, sensitivity of the optical system to the tolerance is low.

Based on the foregoing description, the optical lens 200 can implement shooting in a wide field of view while having low sensitivity to the tolerance.

The second lens L2 has a positive refractive power, which can fully absorb incident light and reduce the lateral size of the lens head of the optical lens 200, reducing the size of the hole provided on the screen of the terminal device.

The object side surface of the second lens L2 is concave at a paraxial position, and the object-image surface of the second lens L2 is convex at the paraxial position.

The third lens L3 has a positive refractive power. The object side surface of the third lens L3 is convex at a paraxial position, and the object-image surface of the third lens L3 is concave at the paraxial position.

The third lens L3 has a small curvature radius, which can buffer an incident angle of light to a subsequent lens, smooth a light trend, and reduce sensitivity of the system to the tolerance.

Yl is an effective clear aperture of an image side surface of a last lens (the third lens L3) of the optical lens 200, and IH is a half image height of the optical lens 200. The optical lens 200 has a small Yl/IH, which can reduce a size of a rear end of the optical lens and helps to minimize a structure of the optical lens 200. While an axial distance between the optical lens 200 and a photosensitive element (such as a charge-coupled element) is increased, a size of a target surface for forming an image is increased, improving a resolution capability of the optical lens 200 for details of an object.

TTL is used for representing space occupied by the optical lens 200 in the optical axis direction. The optical lens 200 has a small IH/TTL, which can reduce the size of the optical lens 200 and obtain an image formation result with a high pixel, namely, improve imaging definition.

MaxY12 is a largest clear aperture of clear apertures of the first lens L1 and the second lens L2, and IH is a half image height of the optical lens 200. The optical lens 200 has a small MaxY12/IH, which can ensure light intake of the system to a certain extent while adapting to different head sizes of the optical lens 200, diversifying detailed information of a measured object. When MaxY12/IH is reduced, for example, MaxY12/IH≤0.5, the head size of the optical lens 200 can be further reduced.

The optical lens has a small MaxY12/IH, so that the optical lens has a small head size and a large image surface.

An entrance pupil diameter of the optical lens 200 is 0.88 mm, and a lateral dimension of the lens head is small.

The following are some test results of optical characteristics of the optical lens 200 in this embodiment.

Taking a curvature of field, distortion, and an aberration of the optical lens 200 as an example, the optical characteristics of the optical lens 200 are analyzed.

Curvature of field (curvature of field) means curvature of an image field. When there is curvature of field in the lens, an intersection of a whole beam does not coincide with an ideal image point. In this case, although a corresponding image point can be obtained at each specific point, a whole image plane is a curved surface. Focal lengths of different positions in a field of view are different. A focal length on an edge of the field of view is different from a focal length on an optical axis, which shows that an image is out of focus in terms of image quality.

Figure 3B:
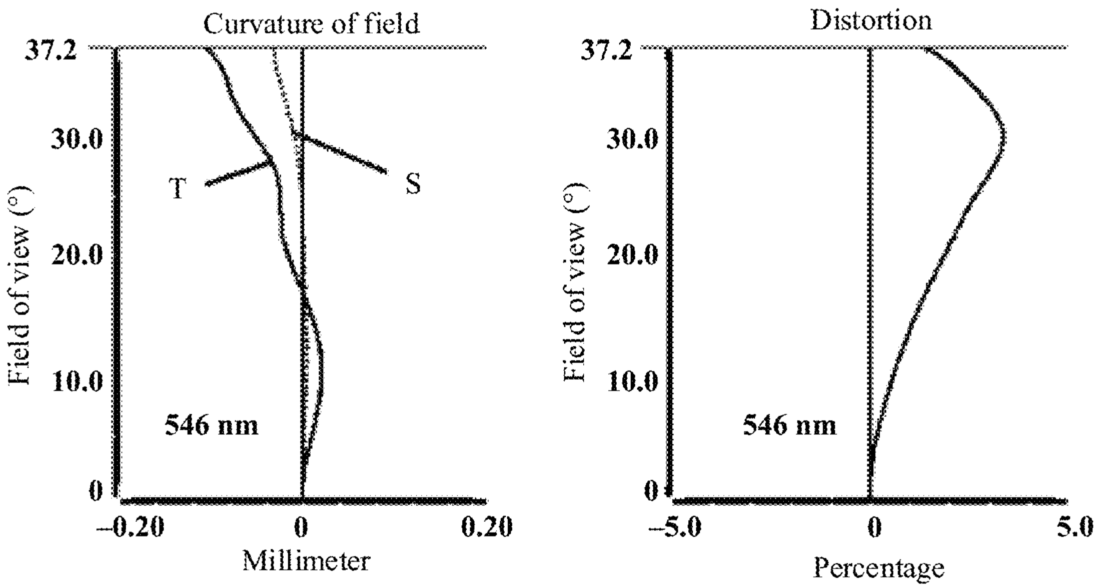
FIG. 3B is a schematic diagram of a curvature of field curve of an optical lens according to an embodiment of this application.

FIG. 3B is a schematic diagram of a curvature of field curve of an optical lens according to an embodiment of this application.

As shown in FIG. 3B, light with a wavelength of 546 nm is imaged by an optical lens 200, where T is a curvature of field curve in a meridian direction, and S is a curvature of field curve in a sagittal direction.

The curvature of field curve shows a distance from a focal plane or an image plane of each point in a field of view to a paraxial focal plane.

The curvature of field curve in the meridian direction shows a distance from a currently determined focal plane to the paraxial focal plane in a z axis direction, which is data on a meridian plane (YZ plane). Data of curvature of field in the sagittal direction is data on a plane perpendicular to the meridian plane.

As shown in FIG. 3B, a curvature of field in the meridian direction and a curvature of field in the sagittal direction imaged by the optical lens 200 have small absolute values, and the curvature of field curve in the meridian direction approximates the curvature of field curve in the sagittal direction. Therefore, the optical lens 200 has small astigmatism and a good imaging effect.

Figure 3C:
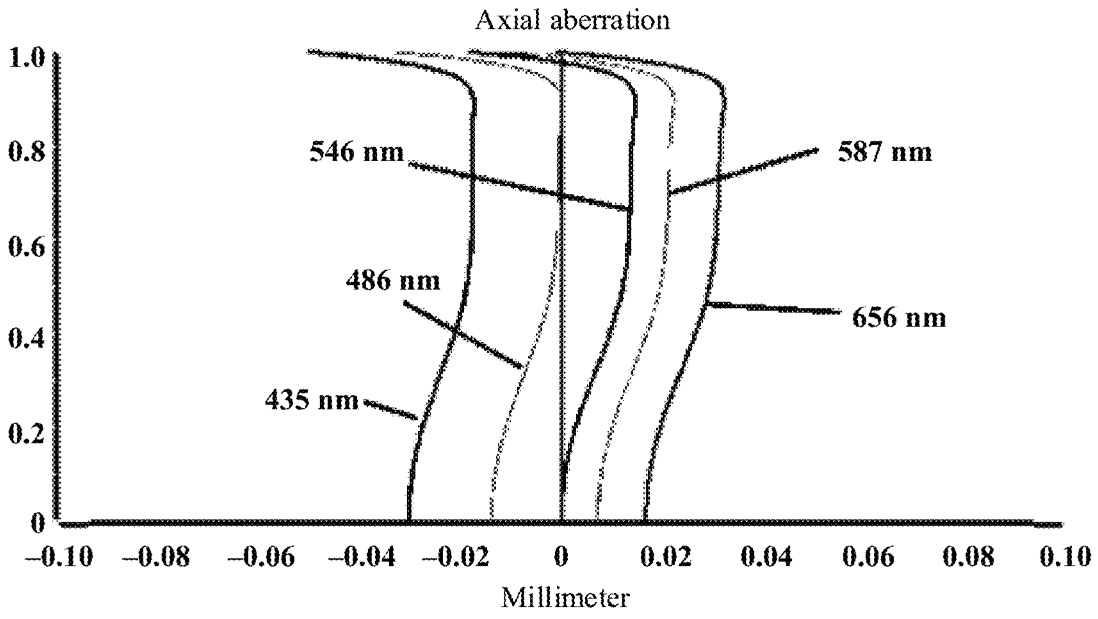
FIG. 3C is a schematic diagram of an axial aberration of an optical lens according to an embodiment of this application.

FIG. 3C is a schematic diagram of an axial aberration of an optical lens according to an embodiment of this application.

Parameters of elements in an optical lens 200 are shown in Table 1a.

When wavelengths are 656 nm, 587 nm, 546 nm, 486 nm, and 435 nm respectively, axial aberrations of imaging by the optical lens 200 are shown in FIG. 3C.

As shown in FIG. 3C, aberrations (an on-axis chromatic aberration and an off-axis chromatic aberration) of imaging by the optical lens is small by using the foregoing light waves with a plurality of wavelengths. In other words, a good imaging effect is provided.

To sum up, the optical lens 200 can adjust a focal length by using a focal power adjustable element, and form a clear image of an object at different shooting distances.

A size of a first lens L1 and a size of a second lens L2 are small. The focal power adjustable element G with a large size and a third lens with a large size are located at a back of the optical lens 200. Compared with the focal power adjustable element G and the third lens L3, the first lens L1 and the second lens L2 have small lateral sizes. Therefore, a lens head of the optical lens 300 has a small lateral size, so that a small hole can be provided.

In the foregoing embodiment, a second lens group of the optical lens includes one lens, and the second lens group of the optical lens may alternatively include lenses of another quantity. In the following embodiment, the optical lens 200 is described by taking the second lens group of the optical lens including three lenses as an example, and a principle is similar to a principle that the second lens group of the optical lens includes lenses of another quantity. In the following embodiment, the optical lens 100 has an imaging effect similar to an imaging effect in the foregoing embodiment. Refer to the description in the foregoing embodiment for details.

An embodiment of this application further provides another optical lens.

Figure 4A:
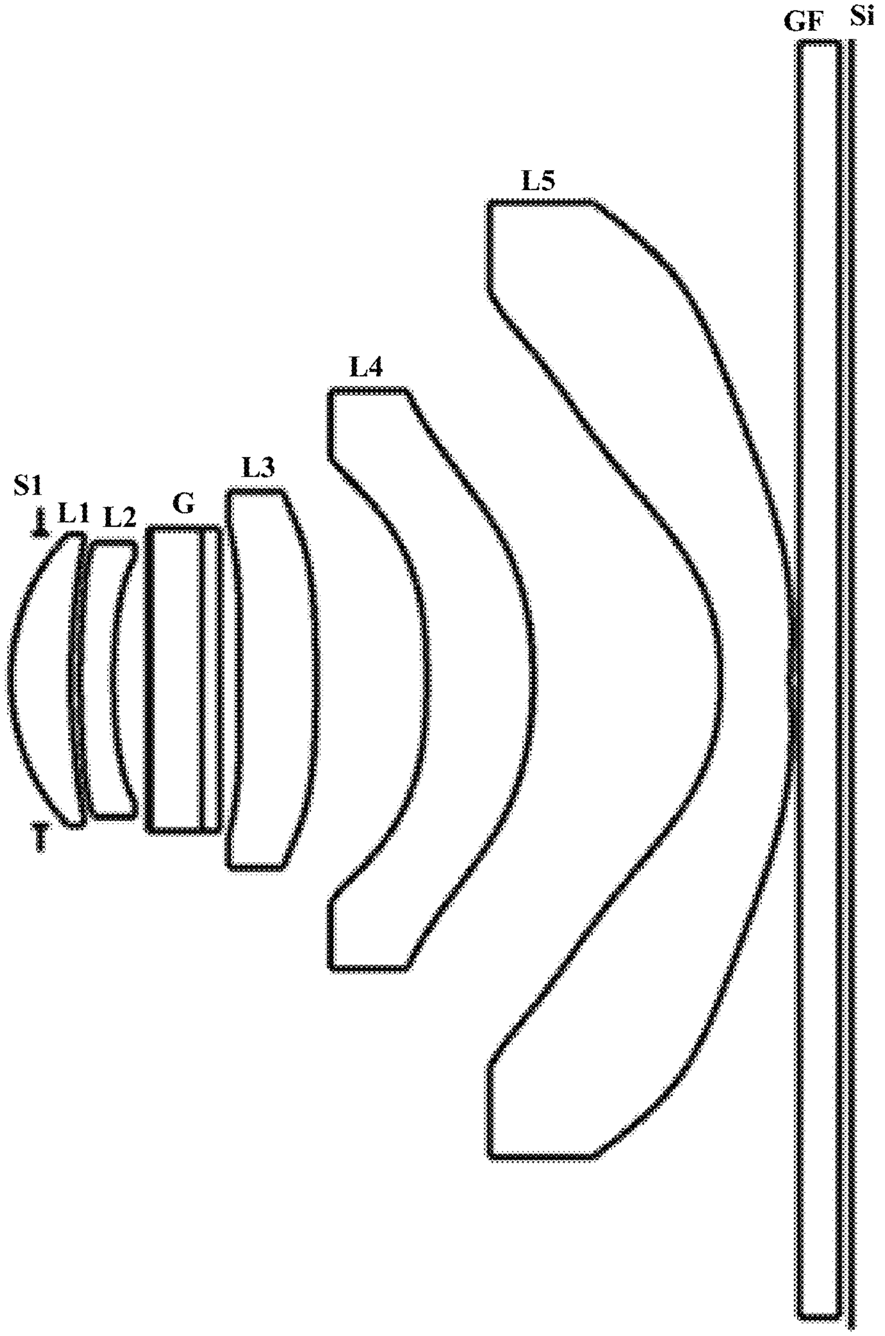
FIG. 4A is a schematic diagram of a structure of an optical lens according to another embodiment of this application.

FIG. 4A is a schematic diagram of a structure of an optical lens according to another embodiment of this application.

As shown in FIG. 4A, a lens module 200 includes: a first lens group 201, a focal power adjustable element G, and a second lens group 202 in sequence from an object side to an image side in an optical axis direction.

The first lens group 201 includes a first lens L1 and a second lens L2 in sequence from an object side to an image side in an optical axis direction. The second lens group 202 includes a third lens L3, a fourth lens L4, and a fifth lens L5 in sequence from the object side to the image side in the optical axis direction.

The focal power adjustable element G is located between the second lens L2 and the third lens L3.

To reduce a size of the hole provided on the electronic device, a lateral size of a lens head is to be reduced.

In a possible implementation, the optical lens 200 may further include an optical filter GF. The optical filter GF is located behind the second lens group 202.

In some possible cases, the lens may be made of plastic.

In this embodiment, the lens module 200 includes: the first lens L1, the second lens L2, the focal power adjustable element G, the third lens L3, the fourth lens L4, the fifth lens L5, and an optical filter GF in sequence from the object side to the image side in the optical axis direction.

S is an aperture; and Si is an image surface.

Refer to Table 2a for parameters of elements in the optical lens provided in this embodiment.

TABLE 2a

| Parameters of elements in the optical lens | | | | |
|---|---|---|---|---|
| | R | d | nd | vd |
| S | $R_S$ = Infinity | d0 = −0.153 | | |
| L1 | $R_{object}1$ = 1.353 | d1 = 0.315 | nd1 = 1.5444 | v1 = 55.82 |
| | $R_{image}1$ = 7.266 | d2 = 0.095 | | |
| L2 | $R_{object}2$ = 2.913 | d3 = 0.177 | nd2 = 1.6700 | v2 = 19.39 |
| | $R_{image}2$ = 2.453 | d4 = 0.141 | | |
| G | \ | CT = 0.385 | | |
| L3 | $R_{object}3$ = 14.778 | d5 = 0.405 | nd3 = 1.5444 | v3 = 55.82 |
| | $R_{image}3$ = 7.943 | d6 = 0.562 | | |
| L4 | $R_{object}4$ = −7.013 | d7 = 0.562 | nd4 = 1.6700 | v4 = 19.39 |
| | $R_{image}4$ = −7.165 | d8 = −0.305 | | |
| L5 | $R_{object}5$ = 0.512 | d9 = 0.370 | nd5 = 1.6700 | v5 = 19.39 |
| | $R_{image}5$ = 0.255 | d10 = 0.050 | | |
| GF | $R_{object}g$ = Infinity | d11 = 0.000 | ndg = 1.5168 | Vg = 64.17 |

In Table 2a, meanings of symbols are as follows.

$R_{object}$ 4 is a central curvature radius of an object side surface of the fourth lens L4.

$R_{image}$ 4 is a central curvature radius of an image side surface of the fourth lens L4.

$R_{object}$ 5 is a central curvature radius of an object side surface of the fifth lens L5.

$R_{image}$ 5 is a central curvature radius of an image side surface of the fifth lens L5.

d6 is an on-axis distance from an image side surface of the third lens L3 to the object side surface of the fourth lens L4.

d7 is an on-axis thickness of the fourth lens L4.

d8 is an on-axis distance from the image side surface of the fourth lens L4 to the object side surface of the fifth lens L5.

d9 is an on-axis thickness of the fifth lens L5.

d10 is an on-axis distance from the image side surface of the fifth lens L5 to the object side surface of the optical filter GF.

d11 is an on-axis thickness of the optical filter GF.

d12 is an on-axis distance from the image side surface of the optical filter GF to the image surface Si.

nd4 is a refractive index of a d-line (d-line is green light with a wavelength of 550 nm) of the fourth lens L4.

nd5 is a refractive index of a d-line of the fifth lens L5.

v4 is an Abbe number of the fourth lens L4.

v5 is an Abbe number of the fifth lens L5.

In Table 2a, meanings of other symbols are the same as meanings in Table 1a. The details are not described herein again.

For an aspheric lens surface of each lens, the aspheric surface obtained by Formula (1) in the foregoing embodiment is used.

For values of the conic coefficient k and aspheric coefficients of lenses in the optical lens 200 provided in this embodiment, refer to Table 2b.

In Table 2b, meanings of symbols are the same as meanings in Table 2a. The details are not described herein again.

TABLE 2b

Conic coefficients and aspheric coefficients of elements in the optical lens

| | Conic coefficient | Aspheric coefficient | | | |
|---|---|---|---|---|---|
| | k | A4 | A6 | A8 | A10 |
| $R_{object}1$ | −4.7969E+00 | 1.2237E−01 | −3.3320E−01 | 1.4982E+00 | −3.9439E+00 |
| $R_{image}1$ | 8.6898E+01 | −4.9048E−02 | 3.3151E−02 | −2.0134E−02 | 6.1390E−01 |
| $R_{object}2$ | −1.2738E−03 | −5.0130E−02 | 9.9246E−02 | −2.4781E−01 | 1.4490E+00 |
| $R_{image}2$ | −6.0827E−01 | −3.3215E−02 | 4.7692E−01 | −2.4933E+00 | 9.7240E+00 |
| $R_{object}3$ | −4.2886E+02 | −9.4020E−02 | 3.3571E−01 | −1.6770E+00 | 5.2851E+00 |
| $R_{image}3$ | −3.5028E+02 | −1.6160E−01 | 7.2822E−01 | −5.4901E+00 | 2.3890E+01 |
| $R_{object}4$ | 3.2689E+01 | −9.8465E−01 | 3.9889E+00 | −2.4097E+01 | 9.0146E+01 |
| $R_{image}4$ | 1.0244E+01 | −2.5168E+00 | 1.7573E+01 | −1.0521E+02 | 3.8996E+02 |
| $R_{object}5$ | −5.0013E+02 | −1.1259E+01 | 8.3013E+01 | −2.4106E+02 | 4.0287E+02 |
| $R_{image}5$ | −1.7304E+02 | −8.0301E+00 | 5.6929E+01 | −2.0787E+02 | 4.7889E+02 |

| | Aspheric coefficient | | | | |
|---|---|---|---|---|---|
| | A12 | A14 | A16 | A18 | A20 |
| $R_{object}1$ | 5.8365E+00 | −4.1846E+00 | 3.2774E−01 | 1.3032E+00 | −5.4541E−01 |
| $R_{image}1$ | −2.6326E+00 | 5.0612E+00 | −5.1701E+00 | 2.7463E+00 | −6.0481E−01 |
| $R_{object}2$ | −4.6934E+00 | 8.3724E+00 | −8.4164E+00 | 4.4967E+00 | −1.0002E+00 |
| $R_{image}2$ | −2.3933E+01 | 3.6498E+01 | −3.2910E+01 | 1.5835E+01 | −3.0553E+00 |
| $R_{object}3$ | −1.1162E+01 | 1.5515E+01 | −1.3525E+01 | 6.6917E+00 | −1.4282E+00 |
| $R_{image}3$ | −6.5186E+01 | 1.1114E+02 | −1.1477E+02 | 6.5752E+01 | −1.5995E+01 |
| $R_{object}4$ | −2.0644E+02 | 3.0142E+02 | −2.8200E+02 | 1.5869E+02 | −4.1010E+01 |
| $R_{image}4$ | −8.8159E+02 | 1.2519E+03 | −1.1029E+03 | 5.5477E+02 | −1.2225E+02 |
| $R_{object}5$ | −4.3859E+02 | 2.8081E+02 | −2.6049E+01 | −7.0718E+01 | 1.8453E+01 |
| $R_{image}5$ | −7.0475E+02 | 6.1275E+02 | −2.5543E+02 | 3.3148E+00 | 2.3972E+01 |

When parameters of elements in the optical lens 200 of this embodiment are described in Table 2a, refer to Table 2c for some parameters of the optical lens 200.

TABLE 2c

Parameters of the optical lens

| Parameter | First structure | Second structure | Third structure |
|---|---|---|---|
| OBJ (mm) | 400 | 150 | 1,200 |
| fG (mm) | 3759.82 | 156.66 | −469.98 |
| IH | 3.432 | 3.432 | 3.432 |
| TTL | 4.45 | 4.45 | 4.45 |
| f | 3.70 | 3.44 | 3.82 |
| ΣCT12/TTL | 0.12 | 0.12 | 0.12 |
| TTL/f | 1.20 | 1.30 | 1.17 |
| Fno | 2.40 | 2.40 | 2.40 |
| f1/f | 0.87 | 0.93 | 0.84 |
| f2/f | −2.72 | −2.93 | −2.64 |
| $(R_{object}3 + R_{image}3)/(R_{object}3 - R_{image}3)$ | −93.28 | −93.28 | −93.28 |
| YI/IH | 0.89 | 0.89 | 0.89 |
| IH/TTL | 0.77 | 0.77 | 0.77 |
| MaxY12/IH | 0.45 | 0.45 | 0.46 |
| Fov (°) | 80.01 | 80.19 | 79.94 |

In Table 2c, the first structure, the second structure, and the third structure are parameters of the optical lens 200 separately when shooting an object at three different distances.

Yl is an effective clear aperture of an image side surface of a last lens of the optical lens 200; or an effective clear aperture of the image side surface of the fifth lens L5 in this embodiment.

In Table 2c, meanings of symbols are the same as meanings in Table 1c. The details are not described herein again.

Parameters of the optical lens 200 in this embodiment are analyzed as follows. Refer to the description in the foregoing embodiment for the description in the foregoing embodiment. To avoid repetition, the details are not described in this embodiment.

In this embodiment, the optical lens 200 can form a clear image of the object at different shooting distances by adjusting the focal length. As shown in Table 2c, when OBJ is 400 mm, 150 mm, and 1,200 mm respectively, focal lengths of the optical lens 200 are 3.70 mm, 3.44 mm, and 3.82 mm respectively.

Because a lateral size of the first lens L1 and a lateral size of the second lens L2 are less than a size of the focal power adjustable element G respectively, and a ratio of the first lens L1 and the second lens L2 to the entire size of the optical lens 200 is large (ΣCT12/TTL is large), the lens head has a small lateral size. This enables the size of the hole to be small, increasing a screen-to-body ratio of the terminal.

In addition, when ΣCT12/TTL is large, the lens head of the optical lens 200 has a large size in the optical axis direction, in other words, the optical lens 200 has a deep lens head, and light passes through the optical lens 200 smoothly, increasing smoothness of light entering an optical system.

The lens head has a small lateral size, which can reduce space occupied by the lens head of the optical lens 200.

The optical lens 200 has a small TTL/f. This enables the optical lens 200 to have a small axial size and implement clear imaging of an object at a long shooting distance.

The optical lens 200 has a large full field of view (Fov in Table 2c), and an image obtained by shooting includes abundant information.

An aperture value of the optical lens 200 is small, and intensity of light entering the optical lens 200 is large. This enables the optical lens 200 to have a good imaging effect in a dark shooting environment.

Based on the foregoing description, the optical lens 200 has both a small aperture value and a large field of view.

The first lens L1 has a positive refractive power, to converge incident light, which can compress a size of the lens head of the optical lens 200, and reduce the size of the hole provided on the screen of the terminal.

The object side surface of the first lens L1 is convex at a position close to the optical axis, and the image side surface of the first lens L1 is concave at a position close to the optical axis. This enables an angle between light on the object side surface and light on the image side surface of the first lens L1 to be small, so that light passes gently, helping to correct astigmatism and other aberrations.

f1/f of the optical lens 200 is small. This enables a size of the optical lens 200 in the axial direction to be small, helping to compress a total length of the entire optical system and implementing miniaturization of the size of the optical lens.

When a ratio of the focal length of the first lens L1 to the focal length of the optical lens 200 is small, sensitivity of the optical system to the tolerance is low.

Based on the foregoing description, the optical lens 200 can implement shooting in a wide field of view while having low sensitivity to the tolerance.

The second lens L2 has a negative refractive power, helping to correct distortion and aberration.

The object side surface of the second lens is convex at a paraxial position, and the image side surface of the second lens is concave at the paraxial position.

The third lens L3 is a front-most end of the second lens group and is located at a rear end of the focal power adjustable element G.

The third lens L3 has a positive refractive power. The object side surface of the third lens is convex at a paraxial position, and the image side surface of the third lens is concave at the paraxial position.

The third lens L3 has a small curvature radius, which can buffer an incident angle of light to a subsequent lens, smooth a trend of light, and reduce sensitivity of the system to the tolerance.

The fourth lens L4 has a positive refractive power. The object side surface of the fourth lens is concave at a paraxial position, and the image side surface of the fourth lens is convex at the paraxial position.

The fifth lens L5 has a negative refractive power. The object side surface of the fifth lens is convex at a paraxial position, and the image side surface of the fifth lens is concave at the paraxial position.

Yl is an effective clear aperture of an image side surface of a last lens (the fifth lens L5) of the optical lens 200, and IH is a half image height of the optical lens 200. The optical lens 200 has a small Yl/IH, which can reduce a size of a rear end of the optical lens and helps to minimize a structure of the optical lens 200. While an axial distance between the optical lens 200 and a photosensitive element (such as a charge-coupled element) is increased, a size of a target surface for forming an image is increased, improving a resolution capability of the optical lens 200 for details of an object.

The optical lens 200 has a small IH/TTL, which can reduce the size of the optical lens 200 and obtain an imaging result with a high pixel, namely, improve imaging definition.

MaxY12 is a maximum clear aperture of clear apertures of the first lens L1 and the second lens L2.

The optical lens 200 has a small MaxY12/IH, which can ensure light intake of the system to a certain extent while adapting to different head sizes of the optical lens 200, diversifying detailed information of a measured object.

The optical lens has a small MaxY12/IH, so that the optical lens has a small head size and a large image surface.

An entrance pupil diameter of the optical lens 200 is 1.54 mm, and a lateral dimension of the lens head is small.

The following are some test results of optical characteristics of the optical lens 200 in this embodiment.

Taking a curvature of field, distortion, and an aberration of the optical lens 200 as an example, the optical characteristics of the optical lens 200 are analyzed.

Figure 4B:
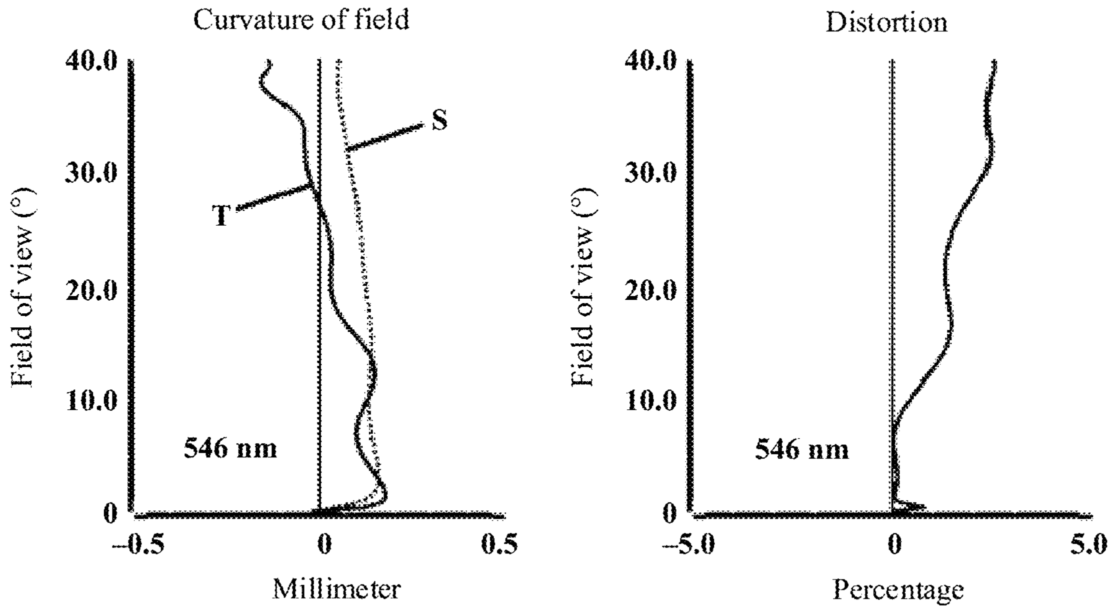
FIG. 4B is a schematic diagram of a curvature of field curve of an optical lens according to another embodiment of this application.

FIG. 4B is a schematic diagram of a curvature of field curve of an optical lens according to another embodiment of this application.

As shown in FIG. 4B, light with a wavelength of 546 nm is imaged by an optical lens 200, where T is a curvature of field curve in a meridian direction, and S is a curvature of field curve in a sagittal direction.

As shown in FIG. 4B, a curvature of field in the meridian direction and a curvature of field in the sagittal direction imaged by the optical lens 200 have small absolute values, and the curvature of field curve in the meridian direction approximates the curvature of field curve in the sagittal direction. Therefore, the optical lens 200 has small astigmatism and a good imaging effect.

Figure 4C:
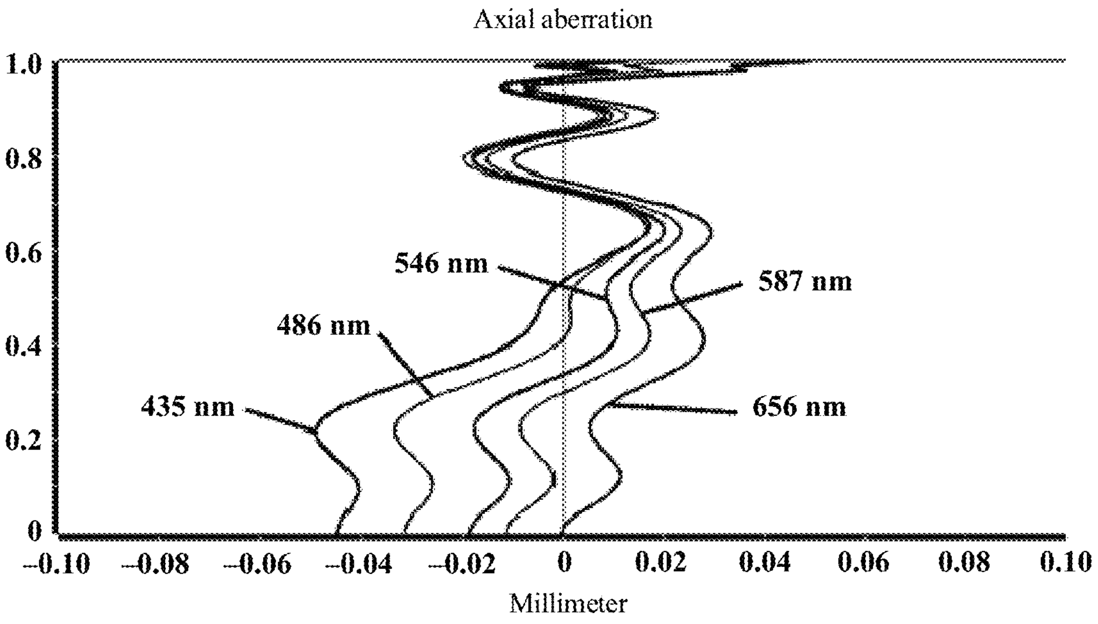
FIG. 4C is a schematic diagram of an axial aberration of an optical lens according to another embodiment of this application.

FIG. 4C is a schematic diagram of an axial aberration of an optical lens according to another embodiment of this application.

Parameters of elements in an optical lens 200 are shown in Table 2a.

When wavelengths are 656 nm, 587 nm, 546 nm, 486 nm, and 435 nm respectively, axial aberrations of imaging by the optical lens 200 are shown in FIG. 4C.

As shown in FIG. 4C, aberrations (an on-axis chromatic aberration and an off-axis chromatic aberration) of imaging by the optical lens is small by using the foregoing light waves with a plurality of wavelengths. In other words, a good imaging effect is provided.

To sum up, the optical lens 200 can adjust a focal length by using a focal power adjustable element, and form a clear image of an object at different shooting distances.

A size of a first lens L1 and a size of a second lens L2 are small. The focal power adjustable element G with a large size, a third lens with a large size, a fourth lens L4 with a large size, and a fifth lens L5 with a large size are located at a back of the optical lens 200. Compared with the focal power adjustable element G, the third lens L3, the fourth lens L4, and the fifth lens L5, the first lens L1 and the second lens L2 have small lateral sizes. Therefore, a lens head of the optical lens 300 has a small lateral size, so that a small hole can be provided.

Compared with that the second lens group of the optical lens 200 includes one lens in the foregoing embodiment, the second lens group of the optical lens 200 in this embodiment includes three lenses, with more lenses, helping to correct aberration of imaging.

In this embodiment, a refractive power of a second lens in the first lens group of the optical lens is negative, helping to correct distortion and aberration.

In the following embodiment, when the second lens L2 has a positive refractive power, incident light can be absorbed fully, and the lateral size of the lens head of the optical lens 200 can be reduced, reducing the size of the hole provided on the screen of the terminal device.

An embodiment of this application further provides another optical lens.

Figure 5A:
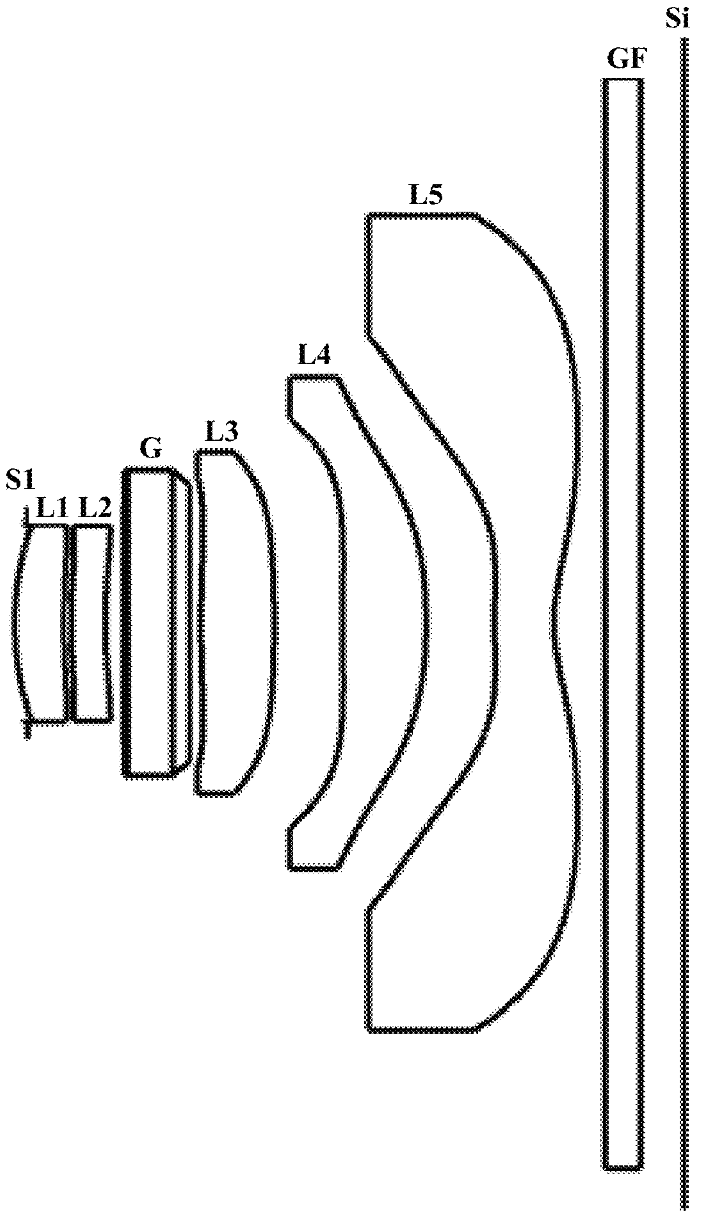
FIG. 5A is a schematic diagram of a structure of an optical lens according to another embodiment of this application.

FIG. 5A is a schematic diagram of a structure of an optical lens according to another embodiment of this application.

As shown in FIG. 5A, a lens module 200 includes: a first lens group 201, a focal power adjustable element G, and a second lens group 202 in sequence from an object side to an image side in an optical axis direction.

The first lens group 201 includes a first lens L1 and a second lens L2 in sequence from an object side to an image side in an optical axis direction. The second lens group 202 includes a third lens L3, a fourth lens L4, and a fifth lens L5 in sequence from the object side to the image side in the optical axis direction.

The focal power adjustable element G is located between the second lens L2 and the third lens L3.

To reduce a size of the hole provided on the electronic device, a lateral size of a lens head is to be reduced.

In a possible implementation, the optical lens 200 may further include an optical filter GF. The optical filter GF is located behind the second lens group 202.

In some possible cases, the lens may be made of plastic.

In this embodiment, the lens module 200 includes: the first lens L1, the second lens L2, the focal power adjustable element G, the third lens L3, the fourth lens L4, the fifth lens L5, and an optical filter GF in sequence from the object side to the image side in the optical axis direction.

S is an aperture; and Si is an image surface.

Refer to Table 3a for parameters of elements in the optical lens provided in this TABLE 3a

| Parameters of elements in the optical lens | | | | |
|---|---|---|---|---|
| | R | d | nd | vd |
| S | $R_S$ = Infinity | d0 = 0.077 | | |
| L1 | $R_{object}1$ = 1.748 | d1 = 0.288 | nd1 = 1.5444 | v1 = 55.82 |
| | $R_{image}1$ = 5.585 | d2 = 0.046 | | |
| L2 | $R_{object}2$ = 3.098 | d3 = 0.20 | nd2 = 1.6700 | v2 = 19.39 |
| | $R_{image}2$ = 3.978 | d4 = 0.036 | | |
| G | \ | CT = 0.385 | | |
| L3 | $R_{object}3$ = 7.804 | d5 = 0.432 | nd3 = 1.5444 | v3 = 55.82 |
| | $R_{image}3$ = 5.853 | d6 = 0.403 | | |
| L4 | $R_{object}4$ = −12.882 | d7 = 0.493 | nd4 = 1.6700 | v4 = 19.39 |
| | $R_{image}4$ = −3.675 | d8 = −0.495 | | |
| L5 | $R_{object}5$ = 1.139 | d9 = 0.350 | nd5 = 1.6700 | v5 = 19.39 |
| | $R_{image}5$ = 0.949 | d10 = 0.300 | | |
| GF | $R_{object}g$ = Infinity | d11 = 0.210 | ndg = 1.5168 | vg = 64.17 |

In Table 3a, meanings of other symbols are the same as meanings in Table 2a. The details are not described herein again.

For an aspheric lens surface of each lens, the aspheric surface obtained by Formula (1) in the foregoing embodiment is used.

For values of the conic coefficient k and aspheric coefficients of lenses in the optical lens 200 provided in this embodiment, refer to Table 3b.

TABLE 3b

| Conic coefficients and aspheric coefficients of elements in the optical lens | | | | | |
|---|---|---|---|---|---|
| | Conic coefficient | Aspheric coefficient | | | |
| | k | A4 | A6 | A8 | A10 |
| $R_{object}1$ | −3.8441E+01 | 2.5913E−01 | −7.0001E−01 | 1.9763E+00 | −4.1787E+00 |
| $R_{image}1$ | −6.2683E+01 | −6.0338E−02 | −2.4718E−02 | 3.0152E−01 | −1.3887E−01 |
| $R_{object}2$ | −7.4018E+01 | −5.0069E−02 | −6.9423E−02 | 1.0004E−01 | 9.5221E−01 |
| $R_{image}2$ | −8.0565E+00 | −8.3159E−02 | 2.4466E−01 | −1.9042E+00 | 8.7864E+00 |
| $R_{object}3$ | 7.8223E−01 | −8.9032E−02 | 3.6151E−01 | −1.7062E+00 | 5.3411E+00 |
| $R_{image}3$ | 6.7380E−01 | −2.2848E−01 | 7.5004E−01 | −5.3504E+00 | 2.3649E+01 |
| $R_{object}4$ | −4.5602E+00 | −7.9689E−01 | 4.0387E+00 | −2.5162E+01 | 9.1008E+01 |
| $R_{image}4$ | −2.3917E+01 | −2.7460E+00 | 1.8029E+01 | −1.0567E+02 | 3.8980E+02 |

TABLE 3b-continued

| Conic coefficients and aspheric coefficients of elements in the optical lens | | | | | |
|---|---|---|---|---|---|
| $R_{object}5$ | −1.0199E+01 | −1.6061E+01 | 8.7280E+01 | −2.3180E+02 | 3.9944E+02 |
| $R_{image}5$ | −9.8962E+00 | −9.0943E+00 | 5.5090E+01 | −2.0550E+02 | 4.7873E+02 |

| | Aspheric coefficient | | | | |
|---|---|---|---|---|---|
| | A12 | A14 | A16 | A18 | A20 |
| $R_{object}1$ | 5.4883E+00 | −3.6734E+00 | 1.2704E+00 | −1.3260E+00 | 1.0573E+00 |
| $R_{image}1$ | −1.8904E+00 | 4.6877E+00 | −5.3425E+00 | 4.6653E+00 | −2.9185E+00 |
| $R_{object}2$ | −4.5620E+00 | 8.2881E+00 | −7.8311E+00 | 5.2867E+00 | −3.0527E+00 |
| $R_{image}2$ | −2.3476E+01 | 3.6815E+01 | −3.2585E+01 | 1.3905E+01 | −1.6893E+00 |
| $R_{object}3$ | −1.1299E+01 | 1.5615E+01 | −1.3479E+01 | 6.5814E+00 | −1.3844E+00 |
| $R_{image}3$ | −6.5433E+01 | 1.1169E+02 | −1.1468E+02 | 6.4875E+01 | −1.5474E+01 |
| $R_{object}4$ | −2.0583E+02 | 3.0061E+02 | −2.8290E+02 | 1.5810E+02 | −3.9639E+01 |
| $R_{image}4$ | −8.8062E+02 | 1.2521E+03 | −1.1041E+03 | 5.5338E+02 | −1.2054E+02 |
| $R_{object}5$ | −4.4917E+02 | 2.2050E+02 | 1.1257E+00 | 1.0862E+02 | −1.3960E+02 |
| $R_{image}5$ | −7.0442E+02 | 6.1448E+02 | −2.5804E+02 | 1.9332E−01 | 2.6956E+01 |

In Table 3b, meanings of symbols are the same as meanings in Table 3a. The details are not described herein again.

When parameters of elements in the optical lens 200 of this embodiment are described in Table 3a, refer to Table 3c for some parameters of the optical lens 200.

TABLE 3c

| Parameters of the optical lens | | | |
|---|---|---|---|
| Parameter | First structure | Second structure | Third structure |
| OBJ (mm) | 400 | 150 | 1,200 |
| fG (mm) | 144.32 | 80.00 | 200.45 |
| IH | 3.432 | 3.432 | 3.432 |
| TTL | 3.96 | 3.96 | 4.45 |
| f | 2.76 | 2.71 | 2.78 |
| ΣCT12/TTL | 0.13 | 0.13 | 0.13 |
| TTL/f | 1.44 | 1.46 | 1.43 |
| Fno | 2.40 | 2.40 | 2.40 |
| f1/f | 2.09 | 2.13 | 2.08 |
| f2/f | 76.39 | 77.70 | 75.91 |
| $(R_{object}3 + R_{image}3)/(R_{object}3 - R_{image}3)$ | 1.80 | 1.80 | 1.80 |
| Yl/IH | 0.84 | 0.84 | 0.84 |
| IH/TTL | 0.87 | 0.87 | 0.87 |
| MaxY12/IH | 0.34 | 0.33 | 0.34 |
| Fov (°) | 101.55 | 101.72 | 101.49 |

In Table 3c, the first structure, the second structure, and the third structure are parameters of the optical lens 200 separately when shooting an object at three different distances.

Yl is an effective clear aperture of an image side surface of a last lens of the optical lens 200; or an effective clear aperture of the image side surface of the fifth lens L5 in this embodiment.

In Table 3c, meanings of symbols are the same as meanings in Table 1c. The details are not described herein again.

Parameters of the optical lens 200 in this embodiment are analyzed as follows. Refer to the description in the foregoing embodiment for the description in the foregoing embodiment. To avoid repetition, the details are not described in this embodiment.

In this embodiment, the optical lens 200 can form a clear image of the object at different shooting distances by adjusting the focal length. As shown in Table 3c, when OBJ is 400 mm, 150 mm, and 1,200 mm respectively, focal lengths of the optical lens 200 are 3.70 mm, 3.44 mm, and 3.82 mm respectively.

The optical lens 200 has a small TTL/f. This enables the optical lens 200 to have a small axial size and implement clear imaging of an object at a long shooting distance.

The optical lens 200 has a large maximum full field of view (Fov in Table 3c), and an image obtained by shooting includes abundant information.

An aperture value of the optical lens 200 is small, and intensity of light entering the optical lens 200 is large. This enables the optical lens 200 to have a good imaging effect in a dark shooting environment.

Based on the foregoing description, the optical lens 200 has both a small aperture value and a large field of view.

The first lens L1 has a positive refractive power, to converge incident light, which can compress a size of the lens head of the optical lens 200, and reduce the size of the hole provided on the screen of the terminal.

The object side surface of the first lens L1 is convex at a position close to the optical axis, and the image side surface of the first lens L1 is concave at a position close to the optical axis. This enables an angle between light on the object side surface and light on the image side surface of the first lens L1 to be small, so that light passes gently, helping to correct astigmatism and other aberrations.

f1/f of the optical lens 200 is small. This enables a size of the optical lens 200 in the axial direction to be small, helping to compress a total length of the entire optical system and implementing miniaturization of the size of the optical lens.

When a ratio of the focal length of the first lens L1 to the focal length of the optical lens 200 is small, sensitivity of the optical system to the tolerance is low.

Based on the foregoing description, the optical lens 200 can implement shooting in a wide field of view while having low sensitivity to the tolerance.

The second lens L2 has a positive refractive power, helping to absorb incident light and reduce a head size of the optical lens.

The object side surface of the second lens is convex at a paraxial position, and the image side surface of the second lens is concave at the paraxial position.

The third lens L3 is a front-most end of the second lens group and is located at a rear end of the focal power adjustable element G.

The third lens L3 has a positive refractive power. The object side surface of the third lens is convex at a paraxial position, and the image side surface of the third lens is concave at the paraxial position.

The third lens L3 has a small curvature radius, which can buffer an incident angle of light to a subsequent lens, smooth a trend of light, and reduce sensitivity of the system to the tolerance.

The fourth lens L4 has a positive refractive power. The object side surface of the fourth lens is concave at a paraxial position, and the image side surface of the fourth lens is convex at the paraxial position.

The fifth lens L5 has a negative refractive power. The object side surface of the fifth lens is convex at a paraxial position, and the image side surface of the fifth lens is concave at the paraxial position.

Yl is an effective clear aperture of an image side surface of a last lens (the fifth lens L5) of the optical lens 200, and IH is a half image height of the optical lens 200. The optical lens 200 has a small Yl/IH, which can reduce a size of a rear end of the optical lens and helps to minimize a structure of the optical lens 200. While an axial distance between the optical lens 200 and a photosensitive element (such as a charge-coupled element) is increased, a size of a target surface for forming an image is increased, improving a resolution capability of the optical lens 200 for details of an object.

The optical lens 200 has a small IH/TTL, which can reduce the size of the optical lens 200 and obtain an imaging result with a high pixel, namely, improve imaging definition.

The optical lens 200 has a small MaxY12/IH, which can ensure light intake of the system to a certain extent while adapting to different head sizes of the optical lens 200, diversifying detailed information of a measured object.

Compared with that the second lens group of the optical lens in the foregoing embodiment includes one lens, the second lens group of the optical lens 200 in this embodiment includes three lenses.

An entrance pupil diameter of the optical lens 200 is 1.12 mm, and a lateral dimension of the lens head is small.

The following are some test results of optical characteristics of the optical lens 200 in this embodiment.

Taking a curvature of field, distortion, and an aberration of the optical lens 200 as an example, the optical characteristics of the optical lens 200 are analyzed.

Figure 5B:
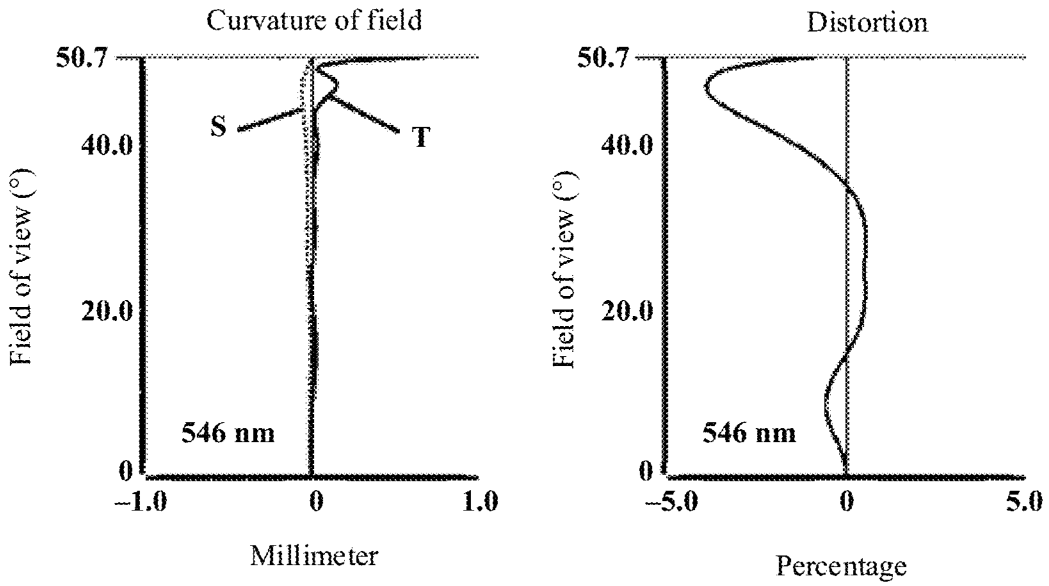
FIG. 5B is a schematic diagram of a curvature of field curve of an optical lens according to another embodiment of this application.

FIG. 5B is a schematic diagram of a curvature of field curve of an optical lens according to another embodiment of this application.

As shown in FIG. 5B, light with a wavelength of 546 nm is imaged by an optical lens 200, where T is a curvature of field curve in a meridian direction, and S is a curvature of field curve in a sagittal direction.

As shown in FIG. 5B, a curvature of field in the meridian direction and a curvature of field in the sagittal direction imaged by the optical lens 200 have small absolute values, and the curvature of field curve in the meridian direction approximates the curvature of field curve in the sagittal direction. Therefore, the optical lens 200 has small astigmatism and a good imaging effect.

Figure 5C:
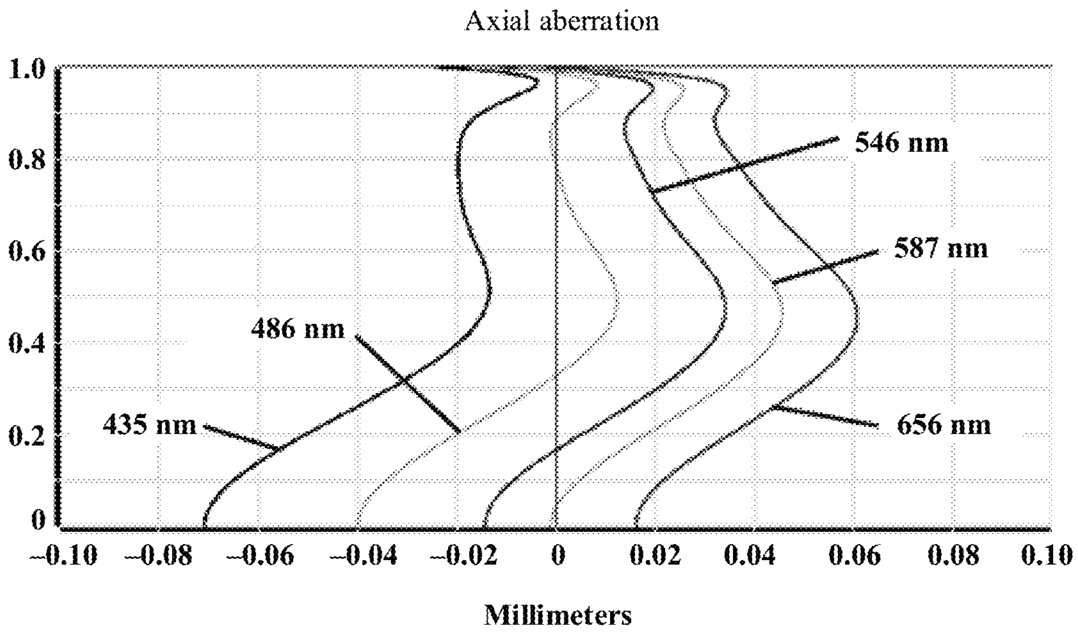
FIG. 5C is a schematic diagram of an axial aberration of an optical lens according to another embodiment of this application.

FIG. 5C is a schematic diagram of an axial aberration of an optical lens according to another embodiment of this application.

Parameters of elements in an optical lens 200 are shown in Table 3a.

When wavelengths are 656 nm, 587 nm, 546 nm, 486 nm, and 435 nm respectively, axial aberrations of imaging by the optical lens 200 are shown in FIG. 5C.

As shown in FIG. 5C, aberrations (an on-axis chromatic aberration and an off-axis chromatic aberration) of imaging by the optical lens is small by using the foregoing light waves with a plurality of wavelengths. In other words, a good imaging effect is provided.

To sum up, the optical lens 200 can adjust a focal length by using a focal power adjustable element, and form a clear image of an object at different shooting distances.

A size of a first lens L1 and a size of a second lens L2 are small. The focal power adjustable element G with a large size, a third lens with a large size, a fourth lens L4 with a large size, and a fifth lens L5 with a large size are located at a back of the optical lens 200. Compared with the focal power adjustable element G, the third lens L3, the fourth lens L4, and the fifth lens L5, the first lens L1 and the second lens L2 have small lateral sizes. Therefore, a lens head of the optical lens 300 has a small lateral size, so that a small hole can be provided.

Compared with the foregoing embodiment, the refractive power of the second lens in the first lens group of the optical lens in this embodiment is positive, helping to absorb incident light and reduce the lateral size of the head of the optical lens 200, and reducing the size of the hole provided on the screen of the terminal device.

The second lens group of the optical lens 200 in this embodiment includes three lenses, with a plurality of lenses, helping to correct aberration of imaging.

In the foregoing embodiment, an image surface side of the fourth lens in the second lens group of the optical lens is convex at a paraxial position. The optical lens is described below with the image surface side of the fourth lens being concave at the paraxial position.

An embodiment of this application further provides another optical lens.

Figure 6A:
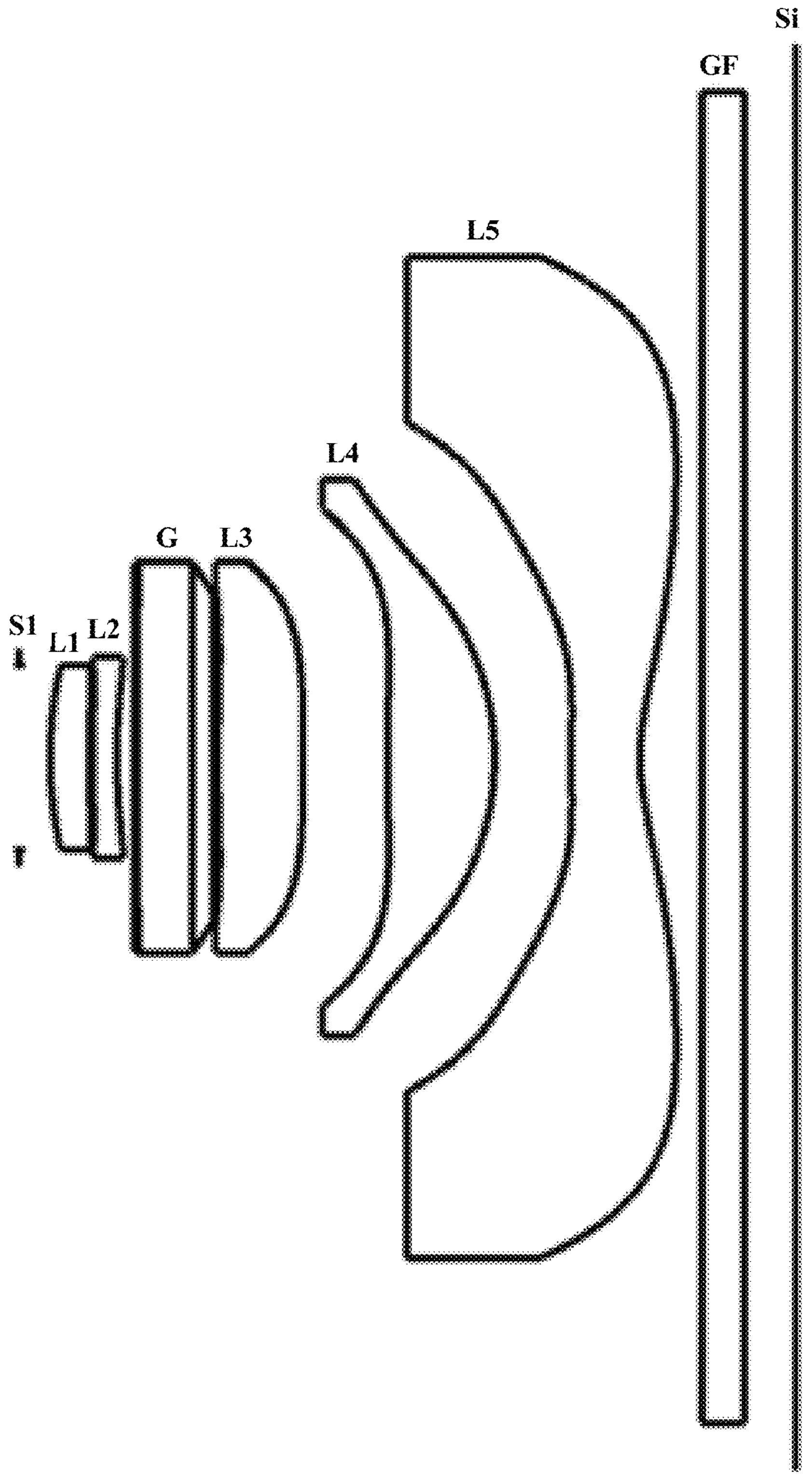
FIG. 6A is a schematic diagram of a structure of an optical lens according to another embodiment of this application.

FIG. 6A is a schematic diagram of a structure of an optical lens according to another embodiment of this application.

As shown in FIG. 6A, a lens module 200 includes: a first lens group 201, a focal power adjustable element G, and a second lens group 202 in sequence from an object side to an image side in an optical axis direction.

The first lens group 201 includes a first lens L1 and a second lens L2 in sequence from an object side to an image side in an optical axis direction. The second lens group 202 includes a third lens L3, a fourth lens L4, and a fifth lens L5 in sequence from the object side to the image side in the optical axis direction.

The focal power adjustable element G is located between the second lens L2 and the third lens L3.

To reduce a size of the hole provided on the electronic device, a lateral size of a lens head is to be reduced.

In a possible implementation, the optical lens 200 may further include an optical filter GF. The optical filter GF is located behind the second lens group 202.

In some possible cases, the lens may be made of plastic.

In this embodiment, the lens module 200 includes: the first lens L1, the second lens L2, the focal power adjustable element G, the third lens L3, the fourth lens L4, the fifth lens L5, and an optical filter GF in sequence from the object side to the image side in the optical axis direction.

S is an aperture; and Si is an image surface.

Refer to Table 4a for parameters of elements in the optical lens provided in this embodiment.

TABLE 4a

| Parameters of elements in the optical lens | | | | |
|---|---|---|---|---|
| | R | d | nd | vd |
| S | $R_S$ = Infinity | d0 = 0.150 | | |
| L1 | $R_{object}1$ = 1.748 | d1 = 0.190 | nd1 = 1.5444 | v1 = 55.82 |
| | $R_{image}1$ = 9.067 | d2 = 0.016 | | |
| L2 | $R_{object}2$ = 3.883 | d3 = 0.119 | nd2 = 1.6700 | v2 = 19.39 |
| | $R_{image}2$ = 3.210 | d4 = 0.077 | | |
| G | \ | CT = 0.385 | | |
| L3 | $R_{object}3$ = 6.082 | d5 = 0.415 | nd3 = 1.5444 | v3 = 55.82 |
| | $R_{image}3$ = 7.194 | d6 = 0.409 | | |
| L4 | $R_{object}4$ = 60.044 | d7 = 0.521 | nd4 = 1.6700 | v4 = 19.39 |
| | $R_{image}4$ = −6.401 | d8 = −0.575 | | |
| L5 | $R_{object}5$ = 1.013 | d9 = 0.335 | nd5 = 1.6700 | v5 = 19.39 |
| | $R_{image}5$ = 1.063 | d10 = 0.300 | | |
| GF | $R_{object}g$ = Infinity | d11 = 0.210 | ndg = 1.5168 | vg = 64.17 |

In Table 4a, meanings of other symbols are the same as meanings in Table 2a. The details are not described herein again.

For an aspheric lens surface of each lens, the aspheric surface obtained by Formula (1) in the foregoing embodiment is used.

For values of the conic coefficient k and aspheric coefficients of lenses in the optical lens 200 provided in this embodiment, refer to Table 4b.

TABLE 4b

| Conic coefficients and aspheric coefficients of elements in the optical lens | | | | | |
|---|---|---|---|---|---|
| | Conic coefficient | Aspheric coefficient | | | |
| | k | A4 | A6 | A8 | A10 |
| $R_{object}1$ | −1.6648E+01 | 1.2591E−01 | −3.0863E−01 | 1.5218E+00 | −3.8670E+00 |
| $R_{image}1$ | 2.6002E+01 | −5.1622E−02 | 1.9529E−02 | −1.2239E−02 | 6.3547E−01 |
| $R_{object}2$ | −5.9696E+01 | −7.5804E−02 | 6.0061E−02 | −4.1326E−01 | 1.2854E+00 |
| $R_{image}2$ | −3.9883E+00 | −5.6139E−02 | 3.3220E−01 | −2.4491E+00 | 9.6328E+00 |
| $R_{object}3$ | 2.1347E+01 | −1.2639E−01 | 3.8493E−01 | −1.7111E+00 | 5.3009E+00 |
| $R_{image}3$ | −6.3438E+02 | −2.4069E−01 | 6.5347E−01 | −5.4871E+00 | 2.3830E+01 |
| $R_{object}4$ | 8.5136E+01 | −9.0858E−01 | 3.9893E+00 | −2.4556E+01 | 9.0075E+01 |
| $R_{image}4$ | −7.6061E+01 | −2.5281E+00 | 1.8091E+01 | −1.0571E+02 | 3.9018E+02 |
| $R_{object}5$ | −1.4539E+01 | −1.0497E+01 | 7.8393E+01 | −2.3929E+02 | 3.9500E+02 |
| $R_{image}5$ | −2.0535E+01 | −9.3980E+00 | 5.5070E+01 | −2.0489E+02 | 4.7880E+02 |

| | Aspheric coefficient | | | | |
|---|---|---|---|---|---|
| | A12 | A14 | A16 | A18 | A20 |
| $R_{object}1$ | 5.9347E+00 | −3.8989E+00 | 1.0675E+00 | 2.8471E+00 | 2.9908E+00 |
| $R_{image}1$ | −2.6327E+00 | 5.0019E+00 | −5.0941E+00 | 3.3077E+00 | 1.4464E+00 |
| $R_{object}2$ | −4.8445E+00 | 8.2771E+00 | −8.2105E+00 | 4.8708E+00 | −3.6520E+00 |
| $R_{image}2$ | −2.4143E+01 | 3.6420E+01 | −3.2716E+01 | 1.6155E+01 | −3.6506E+00 |
| $R_{object}3$ | −1.1152E+01 | 1.5508E+01 | −1.3537E+01 | 6.6974E+00 | −1.4329E+00 |
| $R_{image}3$ | −6.5216E+01 | 1.1111E+02 | −1.1477E+02 | 6.5768E+01 | −1.5922E+01 |
| $R_{object}4$ | −2.0621E+02 | 3.0154E+02 | −2.8221E+02 | 1.5831E+02 | −4.0799E+01 |
| $R_{image}4$ | −8.8133E+02 | 1.2521E+03 | −1.1027E+03 | 5.5424E+02 | −1.2361E+02 |
| $R_{object}5$ | −4.6515E+02 | 2.6770E+02 | −2.2048E+01 | 8.6515E+01 | 3.0583E+02 |
| $R_{image}5$ | −7.0611E+02 | 6.1228E+02 | −2.5579E+02 | 3.9517E+00 | 2.3823E+01 |

In Table 4b, meanings of symbols are the same as meanings in Table 4a. The details are not described herein again.

When parameters of elements in the optical lens 200 of this embodiment are described in Table 4a, refer to Table 4c for some parameters of the optical lens 200.

TABLE 4c

| Parameters of the optical lens | | | |
|---|---|---|---|
| Parameter | First structure | Second structure | Third structure |
| OBJ (mm) | 400 | 150 | 1,200 |
| fG (mm) | 90.20 | 64.43 | 106.12 |
| IH | 3.432 | 3.432 | 3.432 |
| TTL | 3.88 | 3.88 | 3.88 |
| f | 2.14 | 2.12 | 2.15 |
| ΣCT12/TTL | 0.08 | 0.08 | 0.08 |
| TTL/f | 1.81 | 1.83 | 1.81 |
| Fno | 2.40 | 2.40 | 2.40 |
| f1/f | 2.31 | 2.33 | 2.31 |
| f2/f | −5.28 | −5.32 | −5.26 |
| $(R_{object}3 + R_{image}3)/(R_{object}3 - R_{image}3)$ | 0.81 | 0.81 | 0.81 |
| Yl/IH | 0.79 | 0.79 | 0.79 |
| IH/TTL | 0.88 | 0.88 | 0.88 |
| MaxY12/IH | 0.26 | 0.26 | 0.26 |
| FOV (°) | 120.24 | 120.53 | 120.14 |

In Table 4c, the first structure, the second structure, and the third structure are parameters of the optical lens 200 separately when shooting an object at three different distances.

Yl is an effective clear aperture of an image side surface of a last lens of the optical lens 200; or an effective clear aperture of the image side surface of the fifth lens L5 in this embodiment.

In Table 4c, meanings of symbols are the same as meanings in Table 1c. The details are not described herein again.

Parameters of the optical lens 200 in this embodiment are analyzed as follows. Refer to the description in the foregoing embodiment for the description in the foregoing embodiment. To avoid repetition, the details are not described in this embodiment.

In this embodiment, the optical lens 200 can form a clear image of the object at different shooting distances by adjusting the focal length. As shown in Table 4c, when OBJ is 400 mm, 150 mm, and 1,200 mm respectively, focal lengths of the optical lens 200 are 3.70 mm, 3.44 mm, and 3.82 mm respectively.

Because a lateral size of the first lens L1 and a lateral size of the second lens L2 are less than a size of the focal power adjustable element G respectively, and a ratio of the first lens L1 and the second lens L2 to the entire size of the optical lens 200 is large (ΣCT12/TTL is large), the lens head has a small lateral size. This enables the size of the hole to be small, increasing a screen-to-body ratio of the terminal.

In addition, when ΣCT12/TTL is large, the lens head of the optical lens 200 has a large size in the optical axis direction, in other words, the optical lens 200 has a deep lens head, and light passes through the optical lens 200 smoothly, increasing smoothness of light entering an optical system.

The lens head has a small lateral size, which can reduce space occupied by the lens head of the optical lens 200.

The optical lens 200 has a small TTL/f. This enables the optical lens 200 to have a small axial size and implement clear imaging of an object at a long shooting distance.

The optical lens 200 has a large full field of view (Fov in Table 4c), and an image obtained by shooting includes abundant information.

An aperture value of the optical lens 200 is small, and intensity of light entering the optical lens 200 is large. This enables the optical lens 200 to have a good imaging effect in a dark shooting environment.

Based on the foregoing description, the optical lens 200 has both a small aperture value and a large field of view.

The first lens L1 has a positive refractive power, to converge incident light, which can compress a size of the lens head of the optical lens 200, and reduce the size of the hole provided on the screen of the terminal.

The object side surface of the first lens L1 is convex at a position close to the optical axis, and the image side surface of the first lens L1 is concave at a position close to the optical axis. This enables an angle between light on the object side surface and light on the image side surface of the first lens L1 to be small, so that light passes gently, helping to correct astigmatism and other aberrations.

f1/f of the optical lens 200 is small. This enables a size of the optical lens 200 in the axial direction to be small, helping to compress a total length of the entire optical system and implementing miniaturization of the size of the optical lens.

When a ratio of the focal length of the first lens L1 to the focal length of the optical lens 200 is small, sensitivity of the optical system to the tolerance is low.

Based on the foregoing description, the optical lens 200 can implement shooting in a wide field of view while having low sensitivity to the tolerance.

The second lens L2 has a negative refractive power, helping to correct distortion and aberration.

The object side surface of the second lens L2 is convex at a paraxial position, and the image side surface of the second lens is concave at the paraxial position.

The third lens L3 is a front-most end of the second lens group and is located at a rear end of the focal power adjustable element G.

The third lens L3 has a positive refractive power. The object side surface of the third lens L3 is convex at a paraxial position, and the image side surface of the third lens is concave at the paraxial position.

The third lens L3 has a small curvature radius, which can buffer an incident angle of light to a subsequent lens, smooth a trend of light, and reduce sensitivity of the system to the tolerance.

The fourth lens L4 has a positive refractive power. The object side surface of the fourth lens is concave at a paraxial position, and the image side surface of the fourth lens is concave at the paraxial position.

The fifth lens L5 has a negative refractive power. The object side surface of the fifth lens is convex at a paraxial position, and the image side surface of the fifth lens is concave at the paraxial position.

Yl is an effective clear aperture of an image side surface of a last lens (the fifth lens L5) of the optical lens 200, and IH is a half image height of the optical lens 200. The optical lens 200 has a small Yl/IH, which can reduce a size of a rear end of the optical lens and helps to minimize a structure of the optical lens 200. While an axial distance between the optical lens 200 and a photosensitive element (such as a charge-coupled element) is increased, a size of a target surface for forming an image is increased, improving a resolution capability of the optical lens 200 for details of an object.

The optical lens 200 has a small IH/TTL, which can reduce the size of the optical lens 200 and obtain an imaging result with a high pixel, namely, improve imaging definition.

The optical lens 200 has a small MaxY12/IH, which can ensure light intake of the system to a certain extent while adapting to different head sizes of the optical lens 200, diversifying detailed information of a measured object.

Compared with that the second lens group of the optical lens in the foregoing embodiment includes one lens, the second lens group of the optical lens 200 in this embodiment includes three lenses.

An entrance pupil diameter of the optical lens 200 is 1.54 mm, and a lateral dimension of the lens head is small.

The following are some test results of optical characteristics of the optical lens 200 in this embodiment.

Taking a curvature of field, distortion, and an aberration of the optical lens 200 as an example, the optical characteristics of the optical lens 200 are analyzed.

Figure 6B:
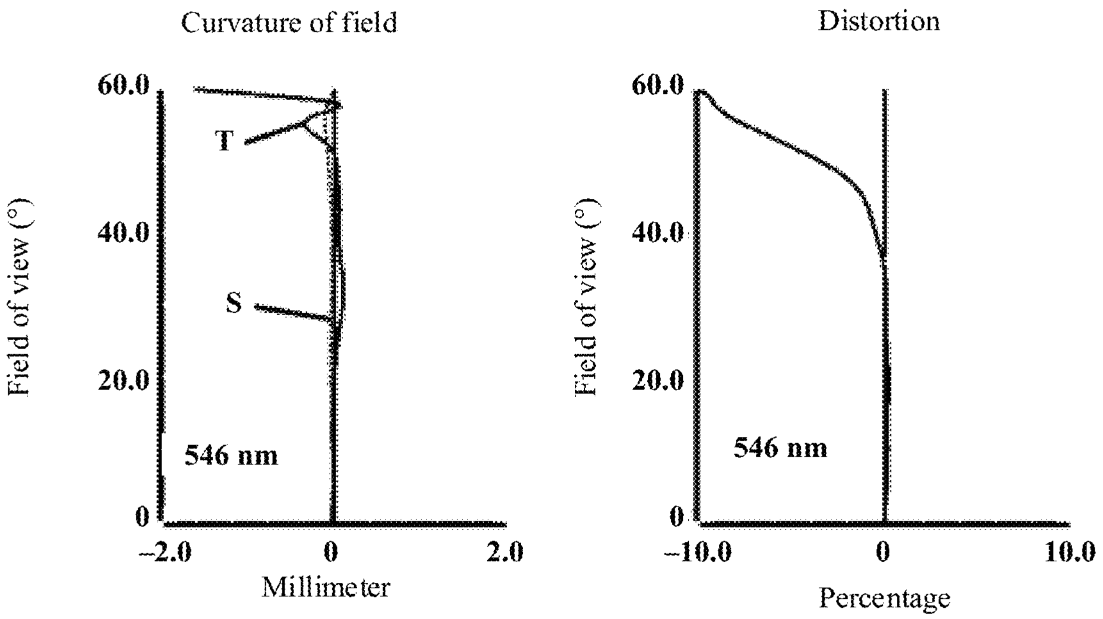
FIG. 6B is a schematic diagram of a curvature of field curve of an optical lens according to another embodiment of this application.

FIG. 6B is a schematic diagram of a curvature of field curve of an optical lens according to another embodiment of this application.

As shown in FIG. 6B, light with a wavelength of 546 nm is imaged by an optical lens 200, where T is a curvature of field curve in a meridian direction, and S is a curvature of field curve in a sagittal direction.

As shown in FIG. 6B, a curvature of field in the meridian direction and a curvature of field in the sagittal direction imaged by the optical lens 200 have small absolute values, and the curvature of field curve in the meridian direction approximates the curvature of field curve in the sagittal direction. Therefore, the optical lens 200 has small astigmatism and a good imaging effect.

Figure 6C:
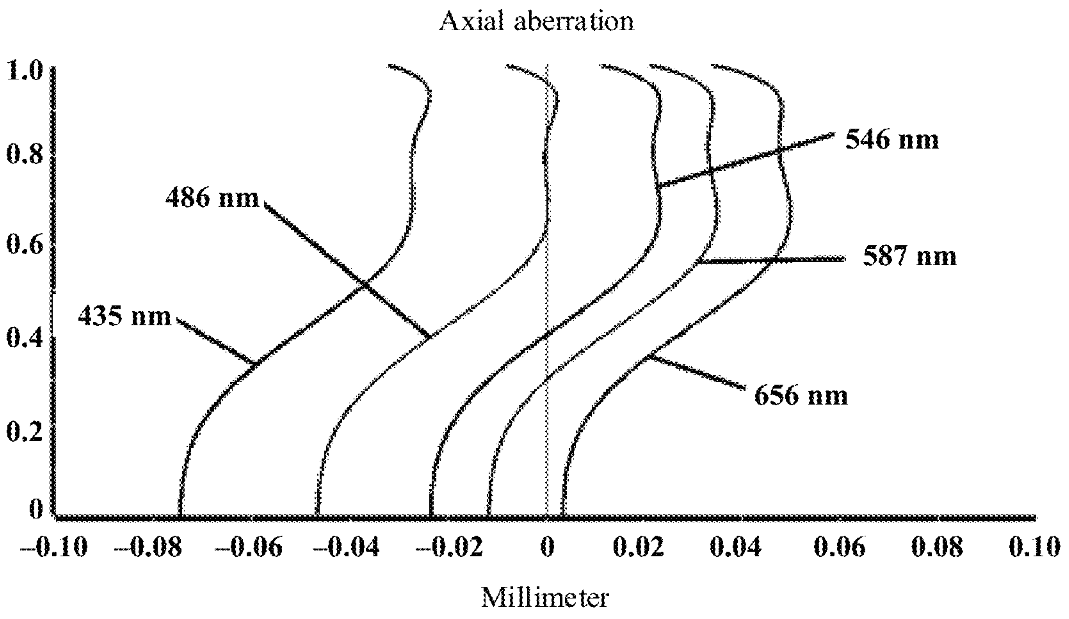
FIG. 6C is a schematic diagram of an axial aberration of an optical lens according to another embodiment of this application.

FIG. 6C is a schematic diagram of an axial aberration of an optical lens according to another embodiment of this application.

Parameters of elements in an optical lens 200 are shown in Table 4a.

When wavelengths are 656 nm, 587 nm, 546 nm, 486 nm, and 435 nm respectively, axial aberrations of imaging by the optical lens 200 are shown in FIG. 6C.

As shown in FIG. 6C, aberrations (an on-axis chromatic aberration and an off-axis chromatic aberration) of imaging by the optical lens is small by using the foregoing light waves with a plurality of wavelengths. In other words, a good imaging effect is provided.

To sum up, the optical lens 200 can adjust a focal length by using a focal power adjustable element, and form a clear image of an object at different shooting distances.

A size of a first lens L1 and a size of a second lens L2 are small. The focal power adjustable element G with a large size, a third lens with a large size, a fourth lens L4 with a large size, and a fifth lens L5 with a large size are located at a back of the optical lens 200. Compared with the focal power adjustable element G, the third lens L3, the fourth lens L4, and the fifth lens L5, the first lens L1 and the second lens L2 have small lateral sizes. Therefore, a lens head of the optical lens 300 has a small lateral size, so that a small hole can be provided.

In the foregoing embodiment, a refractive power of a second lens in the first lens group of the optical lens is negative, helping to correct distortion and aberration.

Compared with that the image side surface of the fourth lens of the optical lens 200 is convex at a paraxial position in the foregoing embodiment, the image surface side of the fourth lens of the optical lens 200 is concave at a paraxial position in this embodiment.

Compared with that the second lens group of the optical lens 200 includes one lens in the foregoing embodiment, the second lens group of the optical lens 200 in this embodiment includes three lenses, with more lenses, helping to correct aberration of imaging.

In some possible implementations, the second lens group of the optical lens may alternatively include four lenses.

An embodiment of this application further provides another optical lens.

Figure 7A:
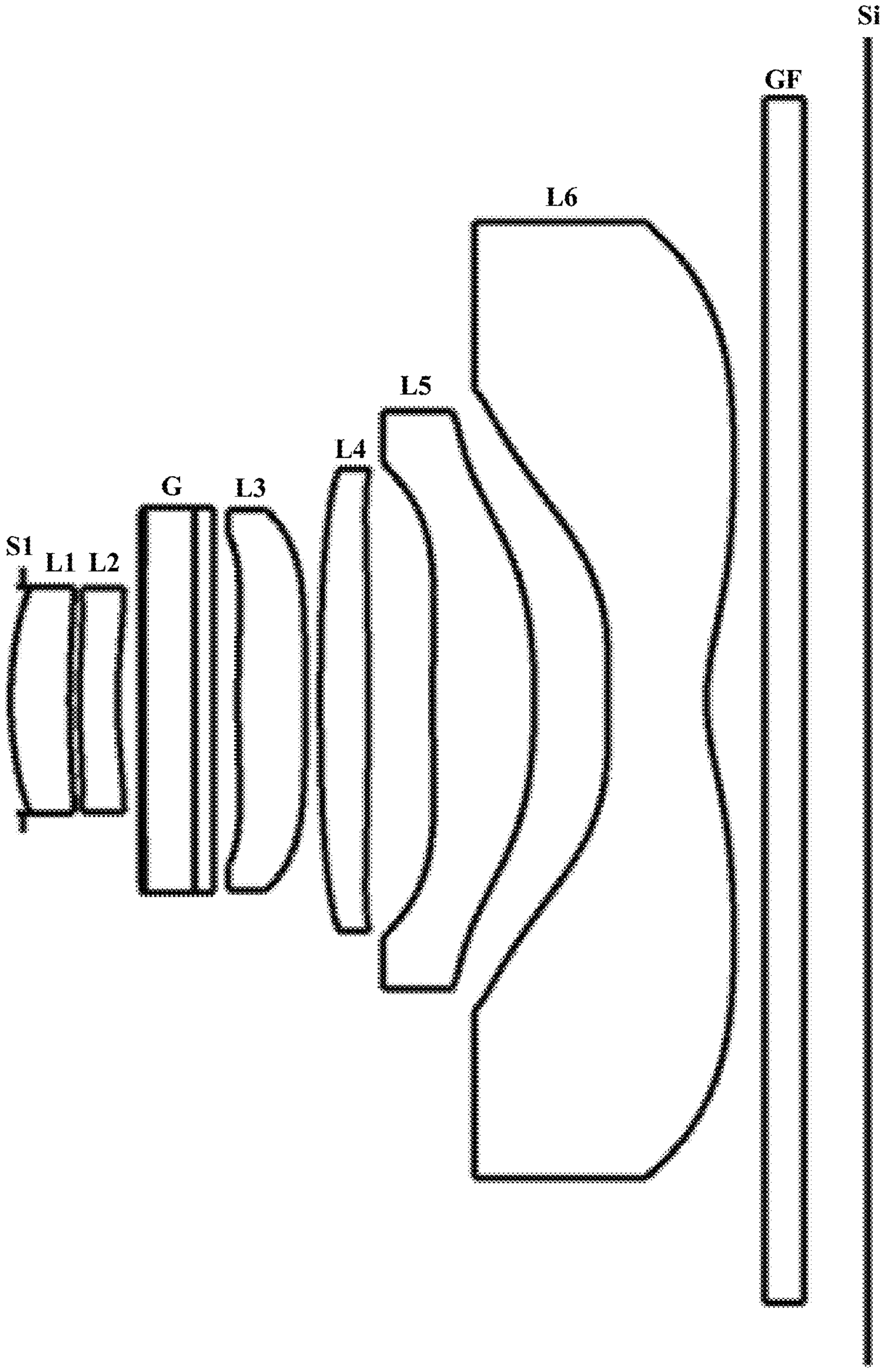
FIG. 7A is a schematic diagram of a structure of an optical lens according to another embodiment of this application.

FIG. 7A is a schematic diagram of a structure of an optical lens according to another embodiment of this application.

As shown in FIG. 7A, a lens module 200 includes: a first lens group 201, a focal power adjustable element G, and a second lens group 202 in sequence from an object side to an image side in an optical axis direction.

The first lens group 201 includes a first lens L1 and a second lens L2 in sequence from an object side to an image side in an optical axis direction. The second lens group 202 includes a third lens L3, a fourth lens L4, a fifth lens L5, and a sixth lens L6 in sequence from the object side to the image side in the optical axis direction.

The focal power adjustable element G is located between the second lens L2 and the third lens L3.

To reduce a size of the hole provided on the electronic device, a lateral size of a lens head is to be reduced.

In a possible implementation, the optical lens 200 may further include an optical filter GF. The optical filter GF is located behind the second lens group 202.

In some possible cases, the lens may be made of plastic.

In this embodiment, the lens module 200 includes the first lens L1, the second lens L2, the focal power adjustable element G, the third lens L3, the fourth lens L4, the fifth lens L5, the sixth lens L6, and an optical filter GF in sequence from the object side to the image side in the optical axis direction.

S is an aperture; and Si is an image surface.

Refer to Table 5a for parameters of elements in the optical lens provided in this embodiment.

TABLE 5a

Parameters of elements in the optical lens

| | R | d | nd | vd |
|---|---|---|---|---|
| S | $R_S$ = Infinity | d0 = −0.066 | | |
| L1 | $R_{object}1$ = 1.748 | d1 = 0.308 | nd1 = 1.5444 | v1 = 55.82 |
| | $R_{image}1$ = 5.988 | d2 = 0.051 | | |
| L2 | $R_{object}2$ = 2.717 | d3 = 0.200 | nd2 = 1.6700 | v2 = 19.39 |
| | $R_{image}2$ = 3.590 | d4 = 0.044 | | |
| G | \ | CT = 0.385 | | |
| L3 | $R_{object}3$ = 6.777 | d5 = 0.350 | nd3 = 1.5444 | v3 = 55.82 |
| | $R_{image}3$ = 5.048 | d6 = 0.080 | | |
| L4 | $R_{object}4$ = 65.409 | d7 = 0.250 | nd4 = 1.6700 | v4 = 19.39 |
| | $R_{image}4$ = −513.897 | d8 = 0.027 | | |
| L5 | $R_{object}5$ = −13.370 | d9 = 0.531 | nd5 = 1.6700 | v5 = 19.39 |
| | $R_{image}5$ = −5.626 | d10 = 0.370 | | |
| L6 | $R_{object}6$ = 1.253 | d11 = 0.519 | nd6 = 1.6700 | v6 = 19.39 |
| | $R_{image}6$ = 0.940 | d12 = 0.300 | | |
| GF | $R_{object}g$ = Infinity | d13 = 0.210 | ndg = 1.5168 | vg = 64.17 |

In Table 5a, meanings of symbols are as follows.

$R_{object}$ 6 is a central curvature radius of an object side surface of the sixth lens L6.

$R_{image}$ 6 is a central curvature radius of an image side surface of the sixth lens L6.

d7 is an on-axis thickness of the fourth lens L4.

d8 is an on-axis distance from the image side surface of the fourth lens LA to the object side surface of the fifth lens L5.

d9 is an on-axis thickness of the fifth lens L5.

d10 is an on-axis distance from the image side surface of the fifth lens L5 to the object side surface of the sixth lens L6.

d11 is an on-axis thickness of the sixth lens L6.

d12 is an on-axis distance from the sixth lens L6 to the object side surface of the optical filter GF.

d13 is an on-axis thickness of the optical filter GF.

d14 is an on-axis distance from the image side surface of the optical filter GF to the image surface Si.

nd6 is a refractive index of a d-line (d-line is green light with a wavelength of 550 nm) of the sixth lens L6.

v6 is an Abbe number of the sixth lens L6.

In Table 5a, meanings of other symbols are the same as meanings in Table 1a. The details are not described herein again.

For an aspheric lens surface of each lens, the aspheric surface obtained by Formula (1) in the foregoing embodiment is used.

For values of the conic coefficient k and aspheric coefficients of lenses in the optical lens 200 provided in this embodiment, refer to Table 5b.

In Table 5b, meanings of symbols are the same as meanings in Table 2a. The details are not described herein again.

TABLE 5b

| Conic coefficients and aspheric coefficients of elements in the optical lens | | | | | |
|---|---|---|---|---|---|
| | Conic coefficient | Aspheric coefficient | | | |
| | k | A4 | A6 | A8 | A10 |
| $R_{object}1$ | −4.5942E+01 | 2.6342E−01 | −6.9345E−01 | 1.9889E+00 | −4.1857E+00 |
| $R_{image}1$ | −5.3294E+01 | −5.4625E−02 | −1.2937E−02 | 3.0956E−01 | −1.2575E−01 |
| $R_{object}2$ | −8.4550E+01 | −4.8323E−02 | −6.7488E−02 | 9.8832E−02 | 9.4568E−01 |
| $R_{image}2$ | −1.3786E+01 | −9.3604E−02 | 2.3287E−01 | −1.9023E+00 | 8.7940E+00 |
| $R_{object}3$ | −9.1770E+00 | −1.0903E−01 | 3.5858E−01 | −1.7065E+00 | 5.3408E+00 |
| $R_{image}3$ | 2.1387E+00 | −2.3609E−01 | 7.3596E−01 | −5.3621E+00 | 2.3652E+01 |
| $R_{object}4$ | 5.3233E+02 | 7.7574E−03 | 1.6877E−03 | 2.6521E−04 | −7.6052E−05 |
| $R_{image}4$ | −5.1903E+02 | −7.1612E−03 | 3.0714E−03 | 3.9031E−03 | 1.9773E−03 |
| $R_{object}5$ | 1.6249E+01 | −7.6955E−01 | 4.0638E+00 | −2.5147E+01 | 9.1023E+01 |
| $R_{image}5$ | −3.2845E+01 | −2.7249E+00 | 1.8064E+01 | −1.0567E+02 | 3.8984E+02 |
| $R_{object}6$ | −1.6811E+01 | −1.5865E+01 | 8.7568E+01 | −2.3119E+02 | 4.0245E+02 |
| $R_{image}6$ | −1.1890E+01 | −8.8024E+00 | 5.5123E+01 | −2.0558E+02 | 4.7878E+02 |

| | Aspheric coefficient | | | | |
|---|---|---|---|---|---|
| | A12 | A14 | A16 | A18 | A20 |
| $R_{object}1$ | 5.4771E+00 | −3.6751E+00 | 1.2744E+00 | −1.2889E+00 | 1.0393E+00 |
| $R_{image}1$ | −1.8967E+00 | 4.6480E+00 | −5.3954E+00 | 4.6457E+00 | −2.7249E+00 |
| $R_{object}2$ | −4.5719E+00 | 8.2817E+00 | −7.8385E+00 | 5.2798E+00 | −2.9478E+00 |
| $R_{image}2$ | −2.3470E+01 | 3.6822E+01 | −3.2586E+01 | 1.3909E+01 | −1.7278E+00 |
| $R_{object}3$ | −1.1300E+01 | 1.5613E+01 | −1.3481E+01 | 6.5811E+00 | −1.3820E+00 |
| $R_{image}3$ | −6.5441E+01 | 1.1168E+02 | −1.1469E+02 | 6.4872E+01 | −1.5473E+01 |
| $R_{object}4$ | −3.7571E−05 | −1.0427E−05 | 2.7052E−06 | 5.4974E−06 | 4.3310E−06 |
| $R_{image}4$ | 1.1331E−03 | 6.0699E−04 | 2.5229E−04 | 5.4536E−05 | −1.0043E−04 |
| $R_{object}5$ | −2.0582E+02 | 3.0061E+02 | −2.8291E+02 | 1.5809E+02 | −3.9650E+01 |
| $R_{image}5$ | −8.8055E+02 | 1.2521E+03 | −1.1040E+03 | 5.5332E+02 | −1.2071E+02 |
| $R_{object}6$ | −4.50E+02 | 2.14E+02 | −3.16E+00 | 6.28E+01 | −1.59E+02 |
| $R_{image}6$ | −7.04E+02 | 6.15E+02 | −2.58E+02 | 3.59E−01 | 2.69E+01 |

In Table 5b, meanings of symbols are the same as meanings in Table 5a. The details are not described herein again.

When parameters of elements in the optical lens 200 of this embodiment are described in Table 5a, refer to Table 5c for some parameters of the optical lens 200.

TABLE 5c

| Parameters of the optical lens | | | |
|---|---|---|---|
| Parameter | First structure | Second structure | Third structure |
| OBJ (mm) | 400 | 150 | 1,200 |
| fG (mm) | 171.81 | 90.20 | 257.72 |
| IH | 3.432 | 3.432 | 3.432 |
| TTL | 4.51 | 4.51 | 4.51 |
| f | 2.81 | 2.75 | 2.83 |
| ΣCT12/TTL | 0.12 | 0.12 | 0.12 |
| TTL/f | 1.60 | 1.64 | 1.59 |
| Fno | 2.90 | 2.90 | 2.90 |
| f1/f | 1.95 | 1.99 | 1.94 |
| f2/f | −52.52 | −53.57 | −52.13 |
| $(R_{object}3 + R_{image}3)/(R_{object}3 - R_{image}3)$ | 6.84 | 6.84 | 6.84 |
| Yl/IH | 1.45 | 1.45 | 1.45 |
| IH/TTL | 0.76 | 0.76 | 0.76 |
| MaxY12/IH | 0.34 | 0.33 | 0.34 |
| Fov (°) | 91.64 | 91.80 | 91.59 |

In Table 5c, the first structure, the second structure, and the third structure are parameters of the optical lens 200 separately when shooting an object at three different distances.

Yl is an effective clear aperture of an image side surface of a last lens of the optical lens 200; or an effective clear aperture of the image side surface of the sixth lens L6 in this embodiment.

In Table 5c, meanings of symbols are the same as meanings in Table 1c. The details are not described herein again.

Parameters of the optical lens 200 in this embodiment are analyzed as follows. Refer to the description in the foregoing embodiment for the description in the foregoing embodiment. To avoid repetition, the details are not described in this embodiment.

In this embodiment, the optical lens 200 can form a clear image of the object at different shooting distances by adjusting the focal length. As shown in Table 5c, when OBJ is 400 mm, 150 mm, and 1,200 mm respectively, focal lengths of the optical lens 200 are 3.70 mm, 3.44 mm, and 3.82 mm respectively.

Because a lateral size of the first lens L1 and a lateral size of the second lens L2 are less than a size of the focal power adjustable element G respectively, and a ratio of the first lens L1 and the second lens L2 to the entire size of the optical lens 200 is large (ΣCT12/TTL is large), the lens head has a small lateral size. This enables the size of the hole to be small, increasing a screen-to-body ratio of the terminal.

In addition, when ΣCT12/TTL is large, the lens head of the optical lens 200 has a large size in the optical axis direction, in other words, the optical lens 200 has a deep lens head, and light passes through the optical lens 200 smoothly, increasing smoothness of light entering an optical system.

The lens head has a small lateral size, which can reduce space occupied by the lens head of the optical lens 200.

The optical lens 200 has a small TTL/f. This enables the optical lens 200 to have a small axial size and implement clear imaging of an object at a long shooting distance.

The optical lens 200 has a large maximum full field of view (Fov in Table 5c), and an image obtained by shooting includes abundant information.

By increasing a quantity of lenses included in the optical lens, a size of the full field of view can be increased.

Different fields of view can be used for shooting in different scopes of view. When the field of view is large, an image obtained by shooting includes more abundant information. For example, when Fov<120°, an object with a wider field of view can be imaged, more abundant image information can be provided, and a visual impact of an imaging result is stronger. When the field of view is small, for example, when Fov<100°, deep distortion correction can be implemented at a small field of view.

Although a size of the full field of view can be increased by increasing a quantity of lenses included in the optical lens, during optimization of a parameter of the optical lens, image distortion and other aberrations caused by an increase of the field of view is to be considered.

An aperture value of the optical lens 200 is small, and intensity of light entering the optical lens 200 is large. This enables the optical lens 200 to have a good imaging effect in a dark shooting environment.

Based on the foregoing description, the optical lens 200 has both a small aperture value and a large field of view.

The first lens L1 has a positive refractive power, to converge incident light, which can compress a size of the lens head of the optical lens 200, and reduce the size of the hole provided on the screen of the terminal.

The object side surface of the first lens L1 is convex at a position close to the optical axis, and the image side surface of the first lens L1 is concave at a position close to the optical axis. This enables an angle between light on the object side surface and light on the image side surface of the first lens L1 to be small, so that light passes gently, helping to correct astigmatism and other aberrations.

f1/f of the optical lens 200 is small. This enables a size of the optical lens 200 in the axial direction to be small, helping to compress a total length of the entire optical system and implementing miniaturization of the size of the optical lens.

When a ratio of the focal length of the first lens L1 to the focal length of the optical lens 200 is small, sensitivity of the optical system to the tolerance is low.

Based on the foregoing description, the optical lens 200 can implement shooting in a wide field of view while having low sensitivity to the tolerance.

The second lens L2 has a negative refractive power, helping to correct distortion and aberration.

The object side surface of the second lens L2 is convex at a position close to the optical axis, and the image side surface of the second lens L2 is concave at a position close to the optical axis.

The third lens L3 is a front-most end of the second lens group and is located at a rear end of the focal power adjustable element G.

The third lens L3 has a positive refractive power. The object side surface of the third lens L3 is convex at a paraxial position, and the image side surface of the third lens is concave at the paraxial position.

The third lens L3 has a small curvature radius, which can buffer an incident angle of light to a subsequent lens, smooth a trend of light, and reduce sensitivity of the system to the tolerance.

The fourth lens L4 has a positive refractive power. The object side surface of the fourth lens L4 is convex at a paraxial position, and the image side surface of the fourth lens is convex at the paraxial position.

The fifth lens L5 has a positive refractive power. The object side surface of the fifth lens L5 is concave at a paraxial position, and the image side surface of the fifth lens L5 is convex at the paraxial position.

The sixth lens L6 has a negative refractive power. The object side surface of the sixth lens L6 is convex at a paraxial position, and the image side surface of the sixth lens L6 is concave at the paraxial position.

Yl is an effective clear aperture of an image side surface of a last lens (the sixth lens L6) of the optical lens 200, and IH is a half image height of the optical lens 200. The optical lens 200 has a small Yl/IH, which can reduce a size of a rear end of the optical lens and helps to minimize a structure of the optical lens 200. While an axial distance between the optical lens 200 and a photosensitive element (such as a charge-coupled element) is increased, a size of a target surface for forming an image is increased, improving a resolution capability of the optical lens 200 for details of an object.

The optical lens 200 has a small IH/TTL, which can reduce the size of the optical lens 200 and obtain an imaging result with a high pixel, namely, improve imaging definition.

The optical lens 200 has a small MaxY12/IH, which can ensure light intake of the system to a certain extent while adapting to different head sizes of the optical lens 200, diversifying detailed information of a measured object.

Compared with that the second lens group of the optical lens in the foregoing embodiment includes one lens, the second lens group of the optical lens 200 in this embodiment includes four lenses.

An entrance pupil diameter of the optical lens 200 is 1.17 mm, and a lateral dimension of the lens head is small.

The following are some test results of optical characteristics of the optical lens 200 in this embodiment.

Figure 7B:
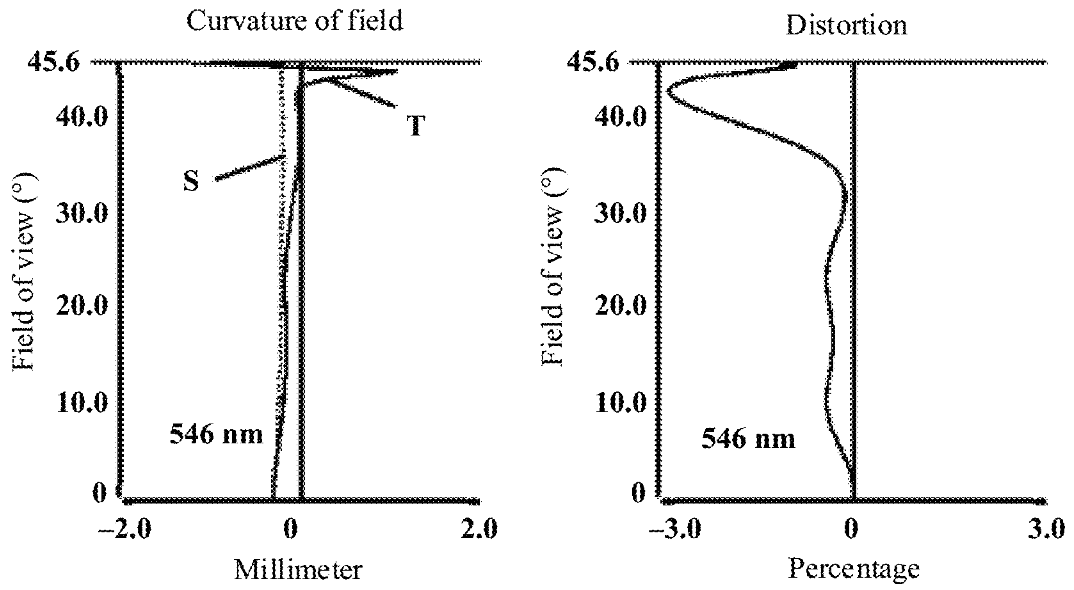
FIG. 7B is a schematic diagram of a curvature of field curve of an optical lens according to another embodiment of this application.

FIG. 7B is a schematic diagram of a curvature of field curve of an optical lens according to another embodiment of this application.

As shown in FIG. 7B, light with a wavelength of 546 nm is imaged by an optical lens 200, where T is a curvature of field curve in a meridian direction, and S is a curvature of field curve in a sagittal direction.

As shown in FIG. 7B, a curvature of field in the meridian direction and a curvature of field in the sagittal direction imaged by the optical lens 200 have small absolute values, and the curvature of field curve in the meridian direction approximates the curvature of field curve in the sagittal direction. Therefore, the optical lens 200 has small astigmatism and a good imaging effect.

Figure 7C:
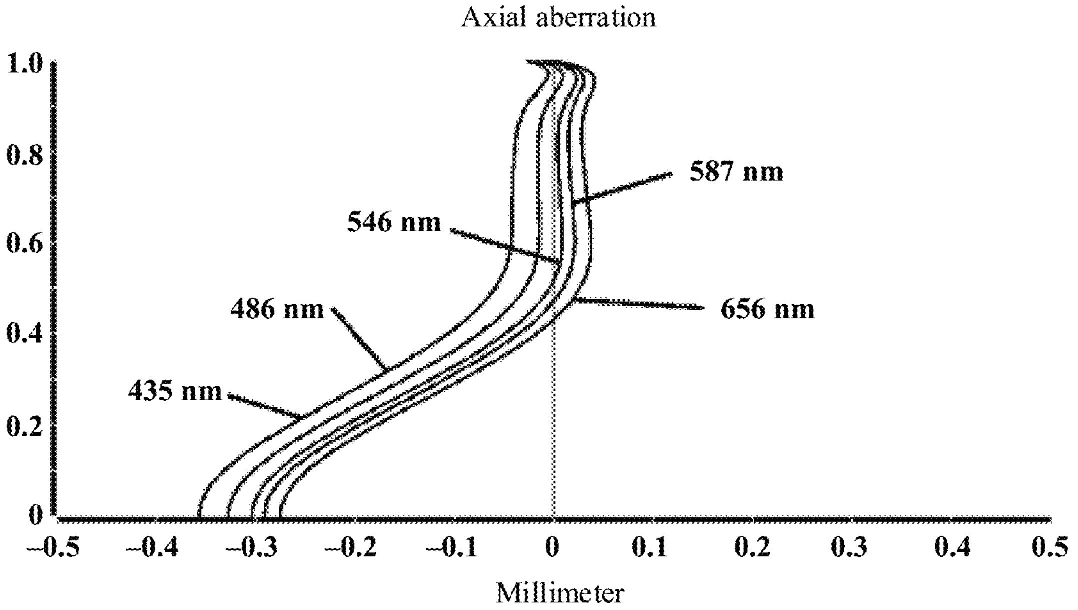
FIG. 7C is a schematic diagram of an axial aberration of an optical lens according to another embodiment of this application.

FIG. 7C is a schematic diagram of an axial aberration of an optical lens according to another embodiment of this application.

Parameters of elements in an optical lens 200 are shown in Table 5a.

When wavelengths are 656 nm, 587 nm, 546 nm, 486 nm, and 435 nm respectively, axial aberrations of imaging by the optical lens 200 are shown in FIG. 7C.

As shown in FIG. 7C, aberrations (an on-axis chromatic aberration and an off-axis chromatic aberration) of imaging by the optical lens is small by using the foregoing light waves with a plurality of wavelengths. In other words, a good imaging effect is provided.

To sum up, the optical lens 200 can adjust a focal length by using a focal power adjustable element, and form a clear image of an object at different shooting distances.

A size of a first lens L1 and a size of a second lens L2 are small. The focal power adjustable element G with a large size, a third lens with a large size, a fourth lens L4 with a large size, a fifth lens L5 with a large size, and a sixth lens L6 with a large size are located at a back of the optical lens 200. Compared with the focal power adjustable element G, the third lens L3, the fourth lens L4, the fifth lens L5, and the sixth lens L6, the first lens L1 and the second lens L2 have small lateral sizes. Therefore, a lens head of the optical lens 300 has a small lateral size, so that a small hole can be provided.

Compared with that the second lens group of the optical lens 200 includes one lens in the foregoing embodiment, the second lens group of the optical lens 200 in this embodiment includes four lenses, with more lenses, helping to correct aberration of imaging.

In the foregoing embodiments, the optical lens is described by taking the second lens group including one lens and including three lenses as examples. The second lens group in the optical lens may alternatively include lenses of another quantity. For example, the second lens group includes two, four, or more than four lenses, and a specific implementation is similar to a specific implementation in the foregoing embodiments. The details are not described herein again.

In the foregoing embodiment, the optical lens is described by taking the first lens group including two lenses as an example. The second lens group in the optical lens may alternatively include lenses of another quantity. In the following embodiment, the optical lens is described by taking the first lens group including three lenses as an example.

An embodiment of this application further provides another optical lens.

Figure 8A:
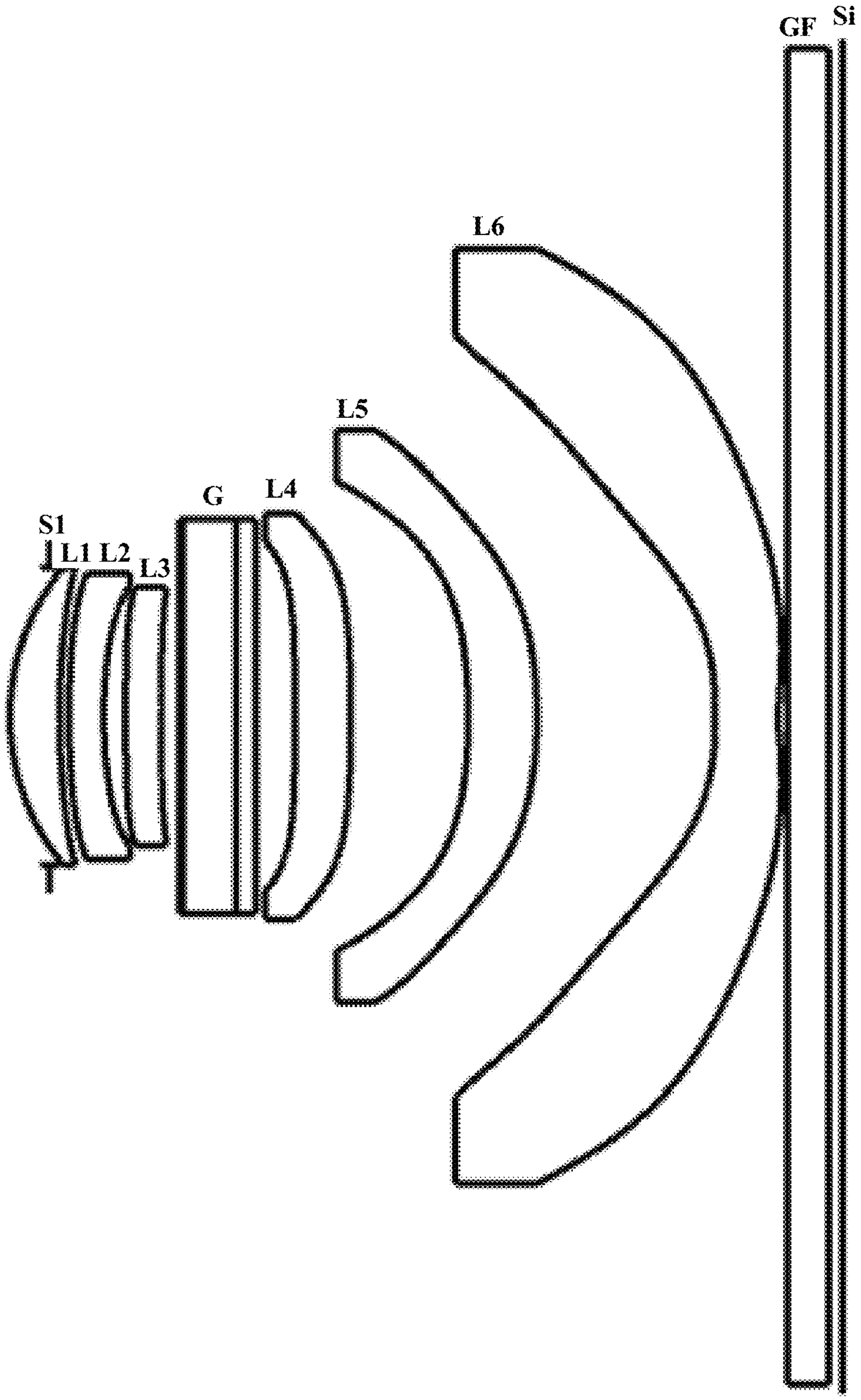
FIG. 8A is a schematic diagram of a structure of an optical lens according to another embodiment of this application.

FIG. 8A is a schematic diagram of a structure of an optical lens according to another embodiment of this application.

As shown in FIG. 8A, a lens module 200 includes: a first lens group 201, a focal power adjustable element G, and a second lens group 202 in sequence from an object side to an image side in an optical axis direction.

The first lens group 201 includes a first lens L1, a second lens L2, and a third lens L3 in sequence from an object side to an image side in an optical axis direction. The second lens group 202 includes a fourth lens L4, a fifth lens L5, and a sixth lens L6 in sequence from the object side to the image side in the optical axis direction.

The focal power adjustable element G is located between the third lens L3 and the fourth lens L4.

To reduce a size of the hole provided on the electronic device, a lateral size of a lens head is to be reduced.

In a possible implementation, the optical lens 200 may further include an optical filter GF. The optical filter GF is located behind the second lens group 202.

In some possible cases, the lens may be made of plastic.

In this embodiment, the lens module 200 includes the first lens L1, the second lens L2, the focal power adjustable element G, the third lens L3, the fourth lens L4, the fifth lens L5, the sixth lens L6, and an optical filter GF in sequence from the object side to the image side in the optical axis direction.

S is an aperture; and Si is an image surface.

Refer to Table 6a for parameters of elements in the optical lens provided in this embodiment.

TABLE 6a

| Parameters of elements in the optical lens | | | | |
|---|---|---|---|---|
| | R | d | nd | vd |
| S | $R_S$ = Infinity | d0 = 0.201 | | |
| L1 | $R_{object}1$ = 1.357 | d1 = 0.250 | nd1 = 1.5444 | v1 = 55.82 |
| | $R_{image}1$ = 7.298 | d2 = 0.069 | | |
| L2 | $R_{object}2$ = 2.737 | d3 = 0.177 | nd2 = 1.6700 | v2 = 19.39 |
| | $R_{image}2$ = 2.335 | d4 = 0.142 | | |
| L3 | $R_{object}3$ = 17.084 | d5 = 0.180 | nd3 = 1.6700 | v3 = 19.39 |
| | $R_{image}3$ = 17.746 | d6 = 0.034 | | |
| G | \ | CT = 0.385 | | |
| L4 | $R_{object}4$ = 16.531 | d7 = 0.285 | nd4 = 1.5444 | v4 = 19.39 |
| | $R_{image}4$ = 8.146 | d8 = 0.597 | | |
| L5 | $R_{object}5$ = −7.002 | d9 = 0.350 | nd5 = 1.6700 | v5 = 19.39 |
| | $R_{image}5$ = −7.146 | d10 = −0.495 | | |
| L6 | $R_{object}6$ = 0.480 | d11 = 0.322 | nd6 = 1.6700 | v6 = 19.39 |
| | $R_{image}6$ = 0.266 | d12 = 0.050 | | |
| GF | $R_{object}g$ = Infinity | d13 = 0.210 | ndg = 1.5168 | vg = 64.17 |

In Table 6a, meanings of symbols are the same as meanings in Table 5a. The details are not described herein again.

For an aspheric lens surface of each lens, the aspheric surface obtained by Formula (1) in the foregoing embodiment is used.

For values of the conic coefficient k and aspheric coefficients of lenses in the optical lens 200 provided in this embodiment, refer to Table 6b.

TABLE 6b

| Conic coefficients and aspheric coefficients of elements in the optical lens | | | | | |
|---|---|---|---|---|---|
| | Conic coefficient | Aspheric coefficient | | | |
| | k | A4 | A6 | A8 | A10 |
| $R_{object}1$ | −5.0979E+00 | 1.1715E−01 | −3.3663E−01 | 1.4914E+00 | −3.9462E+00 |
| $R_{image}1$ | 8.2729E+01 | −4.9203E−02 | 3.2537E−02 | −1.8411E−02 | 6.1596E−01 |
| $R_{object}2$ | 2.4386E+00 | −4.4123E−02 | 9.8488E−02 | −2.4909E−01 | 1.4485E+00 |
| $R_{image}2$ | 1.0425E+00 | −2.6641E−02 | 4.7297E−01 | −2.4880E+00 | 9.7337E+00 |
| $R_{object}3$ | 6.5881E−01 | 8.4643E−03 | 1.6820E−02 | 1.2273E−02 | 8.1930E−03 |
| $R_{image}3$ | 6.5881E−01 | 6.2202E−03 | 1.3933E−02 | 1.2569E−02 | 7.5934E−03 |
| $R_{object}4$ | −7.0910E+01 | −1.0403E−01 | 3.2384E−01 | −1.6774E+00 | 5.2754E+00 |
| $R_{image}4$ | −2.3025E+02 | −1.6041E−01 | 6.8935E−01 | −5.5190E+00 | 2.3866E+01 |
| $R_{object}5$ | 3.3281E+01 | −9.3999E−01 | 3.8528E+00 | −2.4202E+01 | 9.0158E+01 |
| $R_{image}5$ | 2.1291E+01 | −2.7335E+00 | 1.7662E+01 | −1.0511E+02 | 3.8988E+02 |
| $R_{object}6$ | −2.3457E+02 | −1.1683E+01 | 8.2415E+01 | −2.4131E+02 | 4.0305E+02 |
| $R_{image}6$ | −1.0223E+02 | −8.9634E+00 | 5.7127E+01 | −2.0815E+02 | 4.7858E+02 |

TABLE 6b-continued

| Conic coefficients and aspheric coefficients of elements in the optical lens | | | | | |
|---|---|---|---|---|---|
| | Aspheric coefficient | | | | |
| | A12 | A14 | A16 | A18 | A20 |
| $R_{object}1$ | 5.8391E+00 | −4.1804E+00 | 3.2832E−01 | 1.3012E+00 | −5.4410E−01 |
| $R_{image}1$ | −2.6324E+00 | 5.0614E+00 | −5.1694E+00 | 2.7473E+00 | −6.0355E−01 |
| $R_{object}2$ | −4.6935E+00 | 8.3722E+00 | −8.4168E+00 | 4.4962E+00 | −9.9933E−01 |
| $R_{image}2$ | −2.3925E+01 | 3.6502E+01 | −3.2915E+01 | 1.5829E+01 | −3.0642E+00 |
| $R_{object}3$ | 0.0000E+00 | 0.0000E+00 | 0.0000E+00 | 0.0000E+00 | 0.0000E+00 |
| $R_{image}3$ | 0.0000E+00 | 0.0000E+00 | 0.0000E+00 | 0.0000E+00 | 0.0000E+00 |
| $R_{object}4$ | 0.0000E+00 | 0.0000E+00 | 0.0000E+00 | 0.0000E+00 | 0.0000E+00 |
| $R_{image}4$ | −1.1168E+01 | 1.5510E+01 | −1.3530E+01 | 6.6914E+00 | −1.4224E+00 |
| $R_{object}5$ | −2.0647E+02 | 3.0138E+02 | −2.8203E+02 | 1.5870E+02 | −4.1120E+01 |
| $R_{image}5$ | −8.8164E+02 | 1.2518E+03 | −1.1030E+03 | 5.5467E+02 | −1.2236E+02 |
| $R_{object}6$ | −4.38E+02 | 2.81E+02 | −2.54E+01 | −6.95E+01 | 2.08E+01 |
| $R_{image}6$ | −7.05E+02 | 6.13E+02 | −2.55E+02 | 3.68E+00 | 2.47E+01 |

In Table 6b, meanings of symbols are the same as meanings in Table 6a. The details are not described herein again.

When parameters of elements in the optical lens 200 of this embodiment are described in Table 6a, refer to Table 6c for some parameters of the optical lens 200.

TABLE 6c

| Parameters of the optical lens | | | |
|---|---|---|---|
| Parameter | First structure | Second structure | Third structure |
| OBJ (mm) | 400 | 150 | 1,200 |
| fG (mm) | −2349.89 | 234.99 | −626.63 |
| IH | 3.432 | 3.432 | 3.432 |
| TTL | 4.24 | 4.24 | 4.24 |
| f | 3.65 | 3.48 | 3.70 |
| ΣCT12/TTL | 0.11 | 0.11 | 0.11 |
| TTL/f | 1.16 | 1.22 | 1.14 |
| Fno | 2.40 | 2.40 | 2.40 |
| f1/f | 0.89 | 0.94 | 0.88 |
| f2/f | −3.23 | −3.39 | −3.19 |
| $(R_{object}3 + R_{image}3)/(R_{object}3 - R_{image}3)$ | −98.57 | −98.57 | −98.57 |
| Yl/IH | 1.38 | 1.38 | 1.38 |
| IH/TTL | 0.81 | 0.81 | 0.81 |
| MaxY12/IH | 0.44 | 0.44 | 0.44 |
| FOV (°) | 82.20 | 82.08 | 82.37 |

In Table 6c, the first structure, the second structure, and the third structure are parameters of the optical lens 200 separately when shooting an object at three different distances.

Yl is an effective clear aperture of an image side surface of a last lens of the optical lens 200; or an effective clear aperture of the image side surface of the sixth lens L6 in this embodiment.

In Table 6c, meanings of symbols are the same as meanings in Table 1c. The details are not described herein again.

Parameters of the optical lens 200 in this embodiment are analyzed as follows. Refer to the description in the foregoing embodiment for the description in the foregoing embodiment. To avoid repetition, the details are not described in this embodiment.

In this embodiment, the optical lens 200 can form a clear image of the object at different shooting distances by adjusting the focal length. As shown in Table 6c, when OBJ is 400 mm, 150 mm, and 1,200 mm respectively, focal lengths of the optical lens 200 are 3.70 mm, 3.44 mm, and 3.82 mm respectively.

Because a lateral size of the first lens L1 and a lateral size of the second lens L2 are less than a size of the focal power adjustable element G respectively, and a ratio of the first lens L1 and the second lens L2 to the entire size of the optical lens 200 is large (ΣCT12/TTL is large), the lens head has a small lateral size. This enables the size of the hole to be small, increasing a screen-to-body ratio of the terminal.

In addition, when ΣCT12/TTL is large, the lens head of the optical lens 200 has a large size in the optical axis direction, in other words, the optical lens 200 has a deep lens head, and light passes through the optical lens 200 smoothly, increasing smoothness of light entering an optical system.

The lens head has a small lateral size, which can reduce space occupied by the lens head of the optical lens 200.

The optical lens 200 has a small TTL/f. This enables the optical lens 200 to have a small axial size and implement clear imaging of an object at a long shooting distance.

The optical lens 200 has a large maximum full field of view (Fov in Table 6c), and an image obtained by shooting includes abundant information.

An aperture value of the optical lens 200 is small, and intensity of light entering the optical lens 200 is large. This enables the optical lens 200 to have a good imaging effect in a dark shooting environment.

Based on the foregoing description, the optical lens 200 has both a small aperture value and a large field of view.

The first lens L1 has a positive refractive power, to converge incident light, which can compress a size of the lens head of the optical lens 200, and reduce the size of the hole provided on the screen of the terminal.

The object side surface of the first lens L1 is convex at a position close to the optical axis, and the image side surface of the first lens L1 is concave at a position close to the optical axis. This enables an angle between light on the object side surface and light on the image side surface of the first lens L1 to be small, so that light passes gently, helping to correct astigmatism and other aberrations.

f1/f of the optical lens 200 is small. This enables a size of the optical lens 200 in the axial direction to be small, helping to compress a total length of the entire optical system and implementing miniaturization of the size of the optical lens.

When a ratio of the focal length of the first lens L1 to the focal length of the optical lens 200 is small, sensitivity of the optical system to the tolerance is low.

Based on the foregoing description, the optical lens 200 can implement shooting in a wide field of view while having low sensitivity to the tolerance.

The second lens L2 has a negative refractive power, helping to correct distortion and aberration.

The object side surface of the second lens L2 is convex at a paraxial position, and the image side surface of the second lens L2 is concave at the paraxial position.

The third lens L3 has a positive refractive power. The object side surface of the third lens L3 is convex at a paraxial position, and the image side surface of the third lens is concave at the paraxial position.

The fourth lens L4 is a front-most end of the second lens group and is located at a rear end of the focal power adjustable element G.

The fourth lens L4 has a positive refractive power. The object side surface of the fourth lens L4 is convex at a paraxial position, and the image side surface of the fourth lens is concave at the paraxial position.

The fourth lens L4 has a small curvature radius, which can buffer an incident angle of light to a subsequent lens, smooth a trend of light, and reduce sensitivity of the system to the tolerance.

The fifth lens L5 has a positive refractive power. The object side surface of the fifth lens L5 is concave at a paraxial position, and the image side surface of the fifth lens L5 is convex at the paraxial position.

The sixth lens L6 has a negative refractive power. The object side surface of the sixth lens L6 is convex at a paraxial position, and the image side surface of the sixth lens L6 is concave at the paraxial position.

Yl is an effective clear aperture of an image side surface of a last lens (the sixth lens L6) of the optical lens 200, and IH is a half image height of the optical lens 200. The optical lens 200 has a small Yl/IH, which can reduce a size of a rear end of the optical lens and helps to minimize a structure of the optical lens 200. While an axial distance between the optical lens 200 and a photosensitive element (such as a charge-coupled element) is increased, a size of a target surface for forming an image is increased, improving a resolution capability of the optical lens 200 for details of an object.

The optical lens 200 has a small IH/TTL, which can reduce the size of the optical lens 200 and obtain an imaging result with a high pixel, namely, improve imaging definition.

The optical lens 200 has a small MaxY12/IH, which can ensure light intake of the system to a certain extent while adapting to different head sizes of the optical lens 200, diversifying detailed information of a measured object.

Compared with that the second lens group of the optical lens in the foregoing embodiment includes one lens, the second lens group of the optical lens 200 in this embodiment includes four lenses.

An entrance pupil diameter of the optical lens 200 is 1.52 mm, and a lateral dimension of the lens head is small.

The following are some test results of optical characteristics of the optical lens 200 in this embodiment.

Taking a curvature of field, distortion, and an aberration of the optical lens 200 as an example, the optical characteristics of the optical lens 200 are analyzed.

Figure 8B:
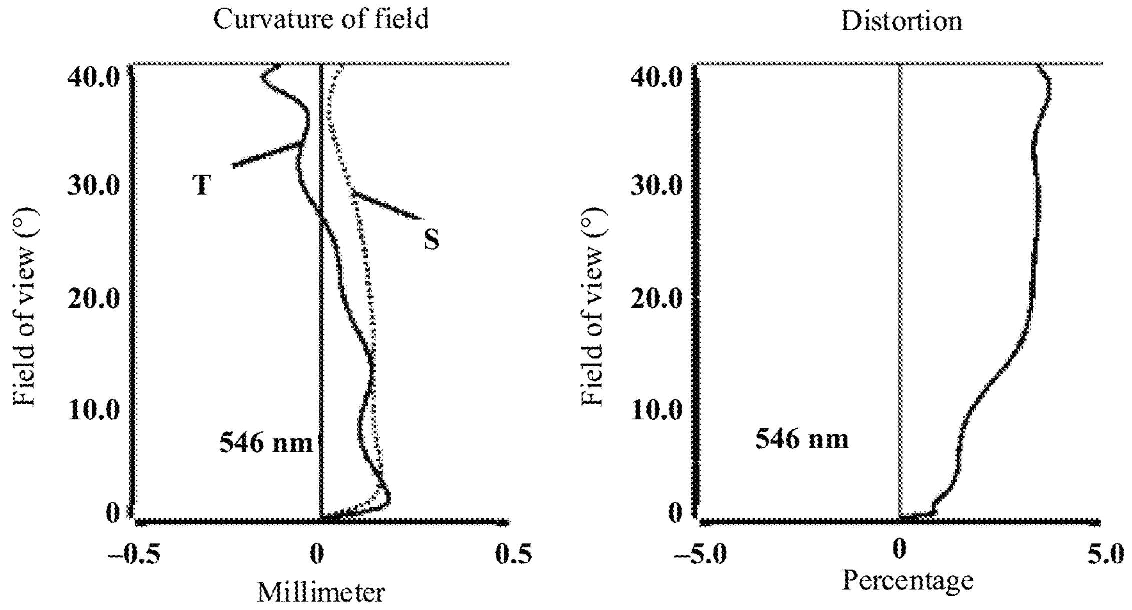
FIG. 8B is a schematic diagram of a curvature of field curve of an optical lens according to another embodiment of this application.

FIG. 8B is a schematic diagram of a curvature of field curve of an optical lens according to another embodiment of this application.

As shown in FIG. 8B, light with a wavelength of 546 nm is imaged by an optical lens 200, where T is a curvature of field curve in a meridian direction, and S is a curvature of field curve in a sagittal direction.

As shown in FIG. 8B, a curvature of field in the meridian direction and a curvature of field in the sagittal direction imaged by the optical lens 200 have small absolute values, and the curvature of field curve in the meridian direction approximates the curvature of field curve in the sagittal direction. Therefore, the optical lens 200 has small astigmatism and a good imaging effect.

Figure 8C:
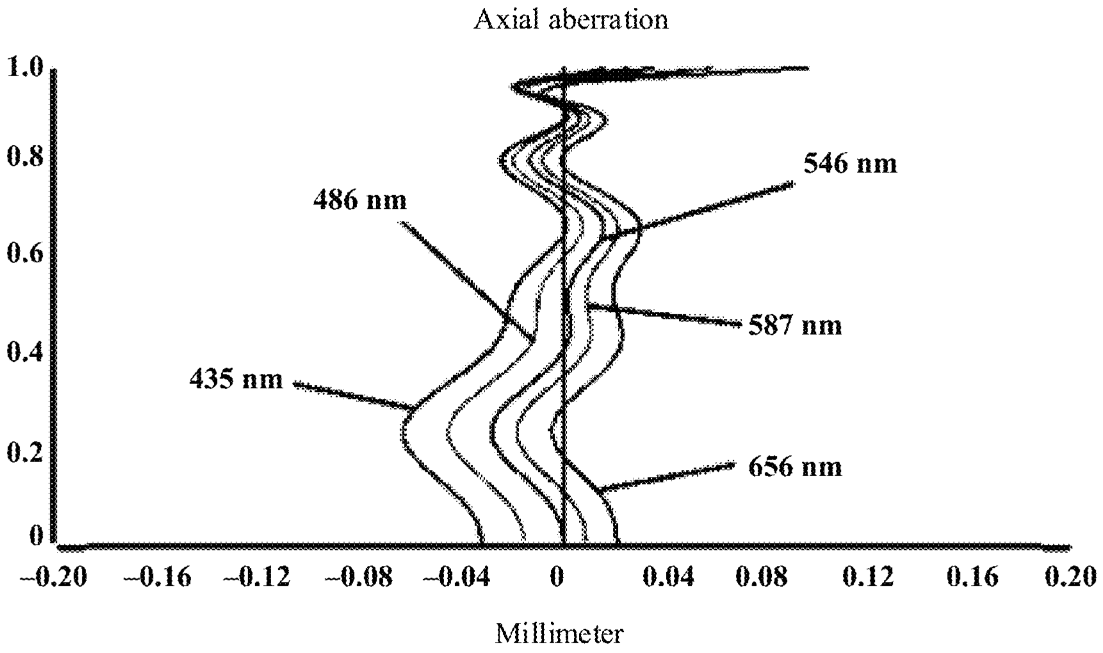
FIG. 8C is a schematic diagram of an axial aberration of an optical lens according to another embodiment of this application.

FIG. 8C is a schematic diagram of an axial aberration of an optical lens according to another embodiment of this application.

Parameters of elements in an optical lens 200 are shown in Table 6a.

When wavelengths are 656 nm, 587 nm, 546 nm, 486 nm, and 435 nm respectively, axial aberrations of imaging by the optical lens 200 are shown in FIG. 8C.

As shown in FIG. 8C, aberrations (an on-axis chromatic aberration and an off-axis chromatic aberration) of imaging by the optical lens is small by using the foregoing light waves with a plurality of wavelengths. In other words, a good imaging effect is provided.

To sum up, the optical lens 200 can adjust a focal length by using a focal power adjustable element, and form a clear image of an object at different shooting distances.

A size of a first lens L1 and a size of a second lens L2 are small. The focal power adjustable element G with a large size, a third lens with a large size, a fourth lens L4 with a large size, a fifth lens L5 with a large size, and a sixth lens L6 with a large size are located at a back of the optical lens 200. Compared with the focal power adjustable element G, the third lens L3, the fourth lens L4, the fifth lens L5, and the sixth lens L6, the first lens L1 and the second lens L2 have small lateral sizes. Therefore, a lens head of the optical lens 300 has a small lateral size, so that a small hole can be provided.

The first lens group of the optical lens 200 in this embodiment includes three lenses, and the second lens group of the optical lens 200 includes three lenses, with a plurality of lenses, helping to correct aberration of imaging.

In the foregoing embodiments, the optical lens is described by taking the first lens group including two lenses and including three lenses as examples. In the optical lens, the first lens group alternatively includes lenses of another quantity, for example, one lens or more than three lenses. A specific implementation principle is similar to a specific implementation principle in the foregoing embodiment. The details are not described herein again.

When the optical lens includes a large quantity of lenses, an aberration correction effect can be improved.

Table 7 is a statistical table of refractive power of lenses in FIG. 3A, FIG. 4A, FIG. 5A, FIG. 6A, FIG. 7A, and FIG. 8A, and shows positive and negative situations of the refractive power of lenses in the optical lens in FIG. 3A, FIG. 4A, FIG. 5A, FIG. 6A, FIG. 7A, and FIG. 8A.

TABLE 7

Statistical table of refractive power of lenses in FIG. 3A, FIG. 4A, FIG. 5A, FIG. 6A, FIG. 7A, and FIG. 8A Refractive power of lenses

| | FIG. 3A | FIG. 4A | FIG. 5A | FIG. 6A | FIG. 7A | FIG. 8A |
|---|---|---|---|---|---|---|
| L1 | Positive | Positive | Positive | Positive | Positive | Positive |
| L2 | Positive | Negative | Positive | Negative | Negative | Negative |
| L3 | Positive | Positive | Positive | Positive | Positive | Positive |
| L4 | \ | Positive | Positive | Positive | Positive | Positive |
| L5 | \ | Negative | Negative | Negative | Positive | Positive |
| L6 | \ | \ | \ | \ | Negative | Negative |

In Table 7, FIG. 3A, FIG. 4A, FIG. 5A, FIG. 6A, FIG. 7A, and FIG. 8A mean optical lenses in FIG. 3A, FIG. 4A, FIG. 5A, FIG. 6A, FIG. 7A, and FIG. 8A respectively.

L1 to L6 mean a first lens to a sixth lens in the optical lenses in FIG. 3A, FIG. 4A, FIG. 5A, FIG. 6A, FIG. 7A, and FIG. 8A respectively. When there is no such lens in the optical lens, the situation is indicated by "\" in the table.

Table 8 is a statistical table of convex surfaces and concave surfaces at optical axes on two sides of lenses in FIG. 3A, FIG. 4A, FIG. 5A, FIG. 6A, FIG. 7A, and FIG. 8A, and shows convex surfaces and concave surfaces at the optical axes on object side surfaces and image side surfaces of lenses in optical lenses in FIG. 3A, FIG. 4A, FIG. 5A, FIG. 6A, FIG. 7A, and FIG. 8A.

TABLE 8

Statistical table of convex surfaces and concave surfaces at optical axes on two sides of lenses in FIG. 3A, FIG. 4A, FIG. 5A, FIG. 6A, FIG. 7A, and FIG. 8A

| | | Convex surfaces and concave surfaces at optical axes on two sides of lenses | | | | | |
|---|---|---|---|---|---|---|---|
| | | FIG. 3A | FIG. 4A | FIG. 5A | FIG. 6A | FIG. 7A | FIG. 8A |
| L1 | Object side surface | Convex | Convex | Convex | Convex | Convex | Convex |
| | Image side surface | Concave | Concave | Concave | Concave | Concave | Concave |
| L2 | Object side surface | Concave | Convex | Convex | Convex | Convex | Convex |
| | Image side surface | Convex | Concave | Concave | Concave | Concave | Concave |
| L3 | Object side surface | Convex | Convex | Convex | Convex | Convex | Convex |
| | Image side surface | Concave | Concave | Concave | Concave | Concave | Concave |
| L4 | Object side surface | \ | Concave | Concave | Concave | Convex | Convex |
| | Image side surface | | Convex | Convex | Concave | Convex | Concave |
| L5 | Object side surface | \ | Convex | Convex | Convex | Concave | Concave |
| | Image side surface | | Concave | Concave | Concave | Convex | Convex |
| L6 | Object side surface | \ | \ | \ | \ | Convex | Convex |
| | Image side surface | | | | | Concave | Concave |

In Table 8, FIG. 3A, FIG. 4A, FIG. 5A, FIG. 6A, FIG. 7A, and FIG. 8A mean optical lenses in FIG. 3A, FIG. 4A, FIG. 5A, FIG. 6A, FIG. 7A, and FIG. 8A respectively.

L1 to L6 mean a first lens to a sixth lens in the optical lenses in FIG. 3A, FIG. 4A, FIG. 5A, FIG. 6A, FIG. 7A, and FIG. 8A respectively. When there is no such lens in the optical lens, the situation is indicated by "\" in the table.

Embodiments in this specification are described in a progressive manner, and that the same or similar parts among the embodiments can be referred to each other. Each embodiment focuses on differences from other embodiments. Apparatus embodiments described above are merely an example. Units and modules described as separate components may or may not be physically separated. In addition, some or all of the units and modules may be selected based on actual requirements, to achieve objectives of the solutions in the embodiments. Persons of ordinary skill in the art may understand and implement embodiments without creative efforts.

The foregoing descriptions are merely specific implementations of this application. It should be noted that persons of ordinary skill in the art may further make several improvements and modifications without departing from the principle of this application, and the improvements and modifications shall fall within the protection scope of this application.

What is claimed is:

1. An optical lens, wherein the optical lens comprises:

a first lens group, a focal power adjustable element, and a second lens group in sequence from an object side to an image side in an optical axis direction, the focal power adjustable element is configured to change a focal length of the optical lens;

the first lens group comprises at least two lenses;

the second lens group comprises at least three lenses in sequence from the object side to the image side, wherein a lens closest to the object side in the second lens group has a positive refractive power, a lens adjacent to the lens closest to the object side in the second lens group has a positive refractive power, and a lens closest to the image side in the second lens group has a negative refractive power;

a first lens has a positive refractive power, wherein the first lens is a first lens in the optical lens from the object side to the image side;

$Yl/IH \leq 1.75$, wherein Yl is an effective clear aperture of an image side surface of a last lens of the optical lens from the object side to the image side, and IH is a half image height of the optical lens; and Fov >79.94°, wherein Fov is a full field of view of the optical lens.

2. The optical lens according to claim 1, wherein the first lens group comprises at least a first lens and a second lens in sequence from the object side to the image side; and $\Sigma CT12)/TTL > 0.08$, wherein ΣCT12 is an on-axis distance from an object side surface of the first lens to an image side surface of the second lens, and TTL is an on-axis distance from the object side surface of the first lens to an image plane of the optical lens.

3. The optical lens according to claim 1, wherein the first lens group comprises at least a first lens and a second lens in sequence from the object side to the image side; and TTL/f≤1.83, wherein TTL is an on-axis distance from an object side surface of the first lens to an image plane of the optical lens, and f is the focal length of the optical lens.

4. The optical lens according to claim 1, wherein the first lens group comprises at least a first lens and a second lens in sequence from the object side to the image side; and an object side surface of the first lens is convex at a paraxial position, and an image side surface of the first lens is concave at the paraxial position; and f1/f≤2.33, wherein f1 is a focal length of the first lens and f is the focal length of the optical lens.

5. The optical lens according to claim 1, wherein the first lens group comprises at least a first lens and a second lens in sequence from the object side to the image side; and −53.57≤f2/f≤77.70, wherein f2 is a focal length of the second lens, and fis the focal length of the optical lens.

6. The optical lens according to claim 1, wherein −98.57≤(R5+R6)/(R5-R6)≤6.84, wherein R5 is a central curvature radius of an object side surface of a third lens of the optical lens from the object side to the image side, and R6 is a central curvature radius of an image side surface of the third lens of the optical lens from the object side to the image side.

7. The optical lens according to claim 1, wherein the first lens group comprises at least a first lens and a second lens in sequence from the object side to the image side; and IH/TTL≤0.88, wherein IH is a half image height of the optical lens, and TTL is an on-axis distance from an object side surface of the first lens to an image plane of the optical lens.

8. The optical lens according to claim 1, wherein the first lens group comprises at least a first lens and a second lens in sequence from the object side to the image side; and MaxY12/IH≤0.89, wherein Max Y12 is a largest clear aperture of clear apertures of the first lens and the second lens, and IH is a half image height of the optical lens in a full field of view.

9. The optical lens according to claim 1, wherein Fno≤2.9, wherein Fno is an aperture value of the optical lens.

10. An electronic device, comprising:

an optical lens, the optical lens including:

a first lens group, a focal power adjustable element, and a second lens group in sequence from an object side to an image side in an optical axis direction, the focal power adjustable element is configured to change a focal length of the optical lens;

the first lens group comprises at least two lenses;

the second lens group comprises at least three lenses in sequence from the object side to the image side, wherein a lens closest to the object side in the second lens group has a positive refractive power, a lens adjacent to the lens closest to the object side in the second lens group has a positive refractive power, and a lens closest to the image side in the second lens group has a negative refractive power;

a first lens has a positive refractive power, wherein the first lens is a first lens in the optical lens from the object side to the image side;

Yl/IH≤1.75, wherein Yl is an effective clear aperture of an image side surface of a last lens of the optical lens from the object side to the image side, and IH is a half image height of the optical lens; and Fov ≥79.94°, wherein Fov is a full field of view of the optical lens.

11. An optical lens, wherein the optical lens comprises:

a first lens group, a focal power adjustable element, and a second lens group in sequence from an object side to an image side in an optical axis direction;

the focal power adjustable element is configured to change a focal length of the optical lens;

the first lens group comprises two lenses or three lenses;

the second lens group comprises at least three lenses in sequence from the object side to the image side, wherein a lens closest to the object side in the second lens group has a positive refractive power, a lens adjacent to the lens closest to the object side in the second lens group has a positive refractive power, and a lens closest to the image side in the second lens group has a negative refractive power;

a first lens has a positive refractive power, wherein the first lens is a first lens in the optical lens from the object side to the image side;

Yl/IH≤1.75, wherein Yl is an effective clear aperture of an image side surface of a last lens of the optical lens from the object side to the image side, and IH is a half image height of the optical lens; and Fov >79.94°, wherein Fov is a full field of view of the optical lens.

12. The optical lens according to claim 11, wherein the first lens group comprises at least the first lens and a second lens in sequence from the object side to the image side; and (ΣCT12)/TTL >0.08, wherein ΣCT12 is an on-axis distance from an object side surface of the first lens to an image side surface of the second lens, and TTL is an on-axis distance from the object side surface of the first lens to an image plane of the optical lens.

13. The optical lens according to claim 11, wherein the first lens group comprises at least the first lens and a second lens in sequence from the object side to the image side; and TTL/f≤1.83, wherein TTL is an on-axis distance from an object side surface of the first lens to an image plane of the optical lens, and f is the focal length of the optical lens.

14. The optical lens according to claim 11, wherein the first lens group comprises at least the first lens and a second lens in sequence from the object side to the image side; and an object side surface of the first lens is convex at a paraxial position, and an image side surface of the first lens is concave at the paraxial position; and f1/f<2.33, wherein f1 is a focal length of the first lens and f is the focal length of the optical lens.

15. The optical lens according to claim 11, wherein the first lens group comprises at least the first lens and a second lens in sequence from the object side to the image side; and −53.57≤f2/f≤77.70, wherein f2 is a focal length of the second lens, and f is the focal length of the optical lens.

16. The optical lens according to claim 11, wherein −98.57≤(R5+R6)/(R5-R6)≤6.84, wherein R5 is a central curvature radius of an object side surface of a third lens of the optical lens from the object side to the image side, and R6 is a central curvature radius of an image side surface of the third lens of the optical lens from the object side to the image side.

17. The optical lens according to claim 11, wherein the first lens group comprises at least the first lens and a second lens in sequence from the object side to the image side; and IH/TTL≤0.88, wherein IH is a half image height of the optical lens, and TTL is an on-axis distance from an object side surface of the first lens to an image plane of the optical lens.

* * * * *